(12) United States Patent
Oohashi et al.

(10) Patent No.: US 6,614,141 B2
(45) Date of Patent: Sep. 2, 2003

(54) AUTOMOTIVE ALTERNATOR AND A METHOD FOR MANUFACTURING A STATOR THEREFOR

(75) Inventors: Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/962,342

(22) Filed: Sep. 26, 2001

(65) Prior Publication Data

US 2002/0079772 A1 Jun. 27, 2002

(30) Foreign Application Priority Data

Dec. 26, 2000 (JP) ........................................ 2000-394725

(51) Int. Cl.[7] ................................................. H02K 3/00
(52) U.S. Cl. ........................................ 310/184; 310/208
(58) Field of Search ............................... 310/179, 180, 310/184, 198–208, 254; 29/596–598

(56) References Cited

U.S. PATENT DOCUMENTS 4,520,287 A    5/1985  Wang et al.
4,857,787 A *  8/1989  Taji et al. ................... 310/208
4,864,716 A    9/1989  Yaginuma et al.
5,022,139 A    6/1991  Jensen
5,881,778 A    3/1999  Barrera
6,061,899 A    5/2000  Cardini et al.

FOREIGN PATENT DOCUMENTS

EP          A-0-748-028     12/1996
EP          A-0-986-160      3/2000
JP              4-26345      1/1992

OTHER PUBLICATIONS

Patent Abstracts of Japan, vol. 016, No. 192, May 11, 1992.
Patent Abstracts of Japan, vol. 018, No. 493, Sep. 14, 1994.

* cited by examiner

*Primary Examiner*—Tran Nguyen
(74) *Attorney, Agent, or Firm*—Sughrue Mion, PLLC

(57) ABSTRACT

Slots are formed in a stator core at a ratio of two per phase per pole and winding phase portions constituted by star-shaped winding units are installed in the stator core so as to line up in six layers radially. An a-phase winding phase portion, a b-phase winding phase portion, and a c-phase winding phase portion constituting a first three-phase alternating-current winding constitute three radially-outer layers, and a d-phase winding phase portion, an e-phase winding phase portion, and an f-phase winding phase portion constituting a second three-phase alternating-current winding constitute three radially-inner layers.

10 Claims, 12 Drawing Sheets

AUTOMOTIVE ALTERNATOR AND A METHOD FOR MANUFACTURING A STATOR THEREFOR

This application is based on Application No. 2000-394725, filed in Japan on Dec. 26, 2000, the contents of which are hereby incorporated by reference.

BACKGROUND OF THE INVENTION

1. Field of the Invention

The present invention relates to a method for manufacturing a stator having a stator core in which slots are formed at a ratio of two per phase per pole, and to an automotive alternator to which the stator is mounted.

2. Description of the Related Art

Generally, an automotive alternator includes: a stator constructed by installing a stator winding into a cylindrical stator core in which slots extending axially are formed at an even angular pitch in a circumferential direction; and a rotor having a field winding disposed on an inner circumferential side of the stator. The slots are disposed in the stator core at a ratio of one per phase per pole, in proportion to the number of phases in the stator winding and the number of magnetic poles in the rotor.

When the slots are disposed at a ratio of one per phase per pole in this manner, the amount of time that a tooth formed between the slots overlaps an adjacent pair of the magnetic poles relative to a radial direction is long, leading to increased magnetic flux leakage. This magnetic flux leakage reduces effective magnetic flux and gives rise to surges in the magnetic flux, resulting in fluctuations in the generated voltage and disturbing the output waveform, which causes ripples when the alternating current is converted into direct current.

Thus, an attempt has been proposed in Japanese Patent Laid-Open No. HEI 4-26345, for example, to reduce magnetic flux leakage by disposing the slots at a ratio of two per phase per pole to shorten the amount of time that a tooth overlaps an adjacent pair of the magnetic poles relative to the radial direction.

FIG. 18 is a schematic diagram in which part of a stator such as that described in Japanese Patent Laid-Open No. HEI 4-26345, for example, is developed into a plan.

In FIG. 18, a stator core 60 is composed by forming a magnetic steel plate into a cylindrical shape, slots 61 extending axially being disposed therein at an even angular pitch in a circumferential direction at a ratio of two per phase per pole. Here, for twelve magnetic poles in a rotor (not shown), seventy-two slots 61 are disposed in the stator core 60 so as to obtain a stator winding 63 composed of first and second three-phase alternating-current windings. The seventy-two slots 61 are disposed at a pitch corresponding to an electrical angle of 30° from each other, being arranged in order of an a-phase slot 61a, a d-phase slot 61d, a b-phase slot 61b, an e-phase slot 61e, a c-phase slot 61c, and an f-phase slot 61f repeatedly in a circumferential direction.

An a-phase winding phase portion 63a is constructed by winding conductor wires into a wave shape in a group of the a-phase slots 61a, a b-phase winding phase portion 63b is constructed by winding conductor wires into a wave shape in a group of the b-phase slots 61b, and in addition, a c-phase winding phase portion 63c is constructed by winding conductor wires into a wave shape in a group of the c-phase slots 61c. The first three-phase alternating-current winding is constructed by forming the a-phase, b-phase, and c-phase winding phase portions 63a, 63b, and 63c wound in this manner into a Y-connection (an alternating-current connection). Here, the a-phase, b-phase, and c-phase slots 61a, 61b, and 61c into which the a-phase, b-phase, and c-phase winding phase portions 63a, 63b, and 63c are inserted have a phase difference corresponding to an electrical angle of 60° from each other.

A d-phase winding phase portion 63d is constructed by winding conductor wires into a wave shape in a group of the d-phase slots 61d, an e-phase winding phase portion 63e is constructed by winding conductor wires into a wave shape in a group of the e-phase slots 61e, and in addition, an f-phase winding portion 63f is constructed by winding conductor wires into a wave shape in a group of the f-phase slots 61f. The second three-phase alternating-current winding is constructed by forming the d-phase, e-phase, and f-phase winding phase portions 63d, 63e, and 63f wound in this manner into a Y-connection. Here, the d-phase, e-phase, and f-phase winding phase portions 63d, 63e, and 63f have a phase difference corresponding to an electrical angle of 60° from each other. Furthermore, the d-phase, e-phase, and f-phase winding phase portions 63d, 63e, and 63f have a phase difference corresponding to an electrical angle of 30° from the a-phase, b-phase, and c-phase winding phase portions 63a, 63b, and 63c, respectively.

A stator is prepared by installing these six winding phase portions 63a, 63b, 63c, 63d, 63e, and 63f in the stator core 60. In an automotive alternator constructed in this manner, alternating-current outputs from the first and second three-phase alternating-current windings are each rectified by separate rectifiers, and then the rectified outputs are combined.

Thus, because the slots 61 are disposed at a ratio of two per phase per pole, portions of a tooth 62 overlapping an adjacent pair of the magnetic poles relative to the radial direction are dramatically reduced. Thus, magnetic flux leakage is reduced, enabling reductions in effective magnetic flux to be suppressed. Similarly, the generation of surges in the magnetic flux is suppressed, reducing fluctuations in the generated voltage and disturbances to the output waveform, thereby reducing ripples when the alternating current is converted into direct current.

Japanese Patent Laid-Open No. HEI 4-26345 described above does not disclose the construction of the stator winding 63 in detail, but if, for example, a stator winding is constructed using star-shaped winding units each composed by forming into a star shape an annular winding unit in which a conductor wire is wound for a predetermined number of winds, because the slots 61 are formed at a ratio of two per phase per pole, short-circuiting is more likely to occur between coil ends in coil end groups of the stator winding 63. Thus, because the alternating-current outputs from the first and second alternating-current windings constituting the stator winding 63 are combined after being rectified by separate rectifiers, short-circuiting between the first and second alternating-current windings leads to poor power generation.

Because the star-shaped winding units are installed in the stator core so as to line up in six layers radially, when a cooling airflow generated by a cooling fan is allowed to flow through the coil end groups of the stator core from an inner circumferential side to an outer circumferential side, heat dissipation from the coil ends varies according to the radial position of the coil ends. Thus, depending on the arrangement of the coil ends in the winding phase portions constituting the first and second three-phase alternating-current windings, heat generated in either of the first and second three-phase alternating-current windings may not be effectively dissipated from the coil ends, making the temperature of the stator increase excessively, thereby leading to reduced output.

One countermeasure for solving such problems has been to construct the stator winding using short U-shaped conductor segments. In that case, because coil end groups of the stator winding can be constructed such that coil ends constituted by turn portions and joint portions of free end portions of the conductor segments are disposed so as to be separated circumferentially and radially, short-circuiting is less likely to occur between the coil ends and heat dissipation from the coil ends increases. However, because the slots are formed at a ratio of two per phase per pole, the number of conductor segments used increases significantly, complicating the process of inserting the conductor segments into the slots, and the number of joints between the free end portions of the conductor segments increases significantly, making the stator production rate poor and preventing cost reductions, thereby making this an unrealistic countermeasure.

SUMMARY OF THE INVENTION

The present invention aims to solve the above problems and an object of the present invention is to provide an automotive alternator enabling the occurrence of poor power generation and decreased output to be suppressed by constructing a stator winding using star-shaped winding units from the viewpoint of improving the stator production rate and reducing costs, and installing six winding phase portions constituting two three-phase alternating-current windings into a stator core while considering the balance of radial positions of coil ends, and to provide a method for manufacturing a stator therefor.

In order to achieve the above object, according to one aspect of the present invention, there is provided an automotive alternator including:

a rotor fixed to a shaft rotatably supported by a case;

a cooling fan disposed on at least one axial end portion of the rotor;

a stator provided with:

a cylindrical stator core in which slots extending axially are formed at a ratio of two per phase per pole so as to line up circumferentially, the stator core being supported by the case so as to envelop the rotor, and a stator winding composed of first and second three-phase alternating-current windings installed in the stator core; and first and second rectifiers for rectifying an alternating-current output from each of the first and second three-phase alternating-current windings, wherein the slots are arranged in order of an a-phase slot, a d-phase slot, a b-phase slot, an e-phase slot, a c-phase slot, and an f-phase slot repeatedly in a circumferential direction;

the stator winding is provided with a-phase, b-phase, c-phase, d-phase, e-phase, and f-phase winding phase portions in each of which a conductor wire coated with electrical insulation is installed in a wave shape in a slot group constituted by slots of like phase so as to extend outwards in an axial direction relative to the stator core from any given slot, extend circumferentially, and enter a subsequent slot of like phase;

the first three-phase alternating-current winding is constructed by forming the a-phase winding phase portion, the b-phase winding phase portion, and the c-phase winding phase portion into an alternating current connection;

the second three-phase alternating-current winding is constructed by forming the d-phase winding phase portion, the e-phase winding phase portion, and the f-phase winding phase portion into an alternating current connection;

the a-phase, b-phase, c-phase, d-phase, e-phase, and f-phase winding phase portions are installed in the stator core so as to line up in six layers radially and the winding phase portions constituting the first three-phase alternating-current winding constitute three radially-outer layers and the winding phase portions constituting the second three-phase alternating-current winding constitute three radially-inner layers.

According to another aspect of the present invention, there is provided an automotive alternator including:

a rotor fixed to a shaft rotatably supported by a case;

a cooling fan disposed on at least one axial end portion of the rotor;

a stator provided with:

a cylindrical stator core in which slots extending axially are formed at a ratio of two per phase per pole so as to line up circumferentially, the stator core being supported by the case so as to envelop the rotor, and a stator winding composed of first and second three-phase alternating-current windings installed in the stator core; and a rectifier for rectifying an alternating-current output from the stator winding, wherein the slots are arranged in order of an a-phase slot, a d-phase slot, a b-phase slot, an e-phase slot, a c-phase slot, and an f-phase slot repeatedly in a circumferential direction;

the stator winding is provided with a-phase, b-phase, c-phase, d-phase, e-phase, and f-phase winding phase portions in each of which a conductor wire coated with electrical insulation is installed in a wave shape in a slot group constituted by slots of like phase so as to extend outwards in an axial direction relative to the stator core from any given slot, extend circumferentially, and enter a subsequent slot of like phase;

the first three-phase alternating-current winding is constructed by forming the a-phase winding phase portion, the b-phase winding phase portion, and the c-phase winding phase portion into an alternating current connection;

the second three-phase alternating-current winding is constructed by forming the d-phase winding phase portion, the e-phase winding phase portion, and the f-phase winding phase portion into an alternating current connection;

the a-phase, b-phase, c-phase, d-phase, e-phase, and f-phase winding phase portions are installed the stator core so as to line up in six layers radially; and a first of the winding phase portions constituting the first three-phase alternating-current winding constitutes one of three radially-inner layers and a second of the winding phase portions constituting the first three-phase alternating-current winding constitutes one of three radially-outer layers.

The winding phase portions constituting the first three-phase alternating-current winding and the winding phase portions constituting the second three-phase alternating-current winding may be lined up alternately in a radial direction.

The a-phase winding phase portion and the e-phase winding phase portion may constitute a first pair of layers on an inner circumferential side, in an intermediate portion, or on an outer circumferential side in a radial direction, the b-phase winding phase portion and the f-phase winding phase portion may constitute a second pair of layers on the inner circumferential side, in the intermediate portion, or on the outer circumferential side in the radial direction, and the c-phase winding phase portion and the d-phase winding phase portion may constitute a third pair of layers on the inner circumferential side, in the intermediate portion, or on the outer circumferential side in the radial direction.

A coil end group of the stator winding may be constituted by coil ends composed of portions of the conductor wires extending outwards from any given slot, extending circumferentially, and entering a subsequent slot of like phase, a varnish being impregnated into the coil end group.

Each of the a-phase, b-phase, c-phase, d-phase, e-phase, and f-phase winding phase portions may be constituted by a divided winding portion.

Radially-adjacent crossover portions of the coil ends may be offset axially.

According to yet another aspect of the present invention, there is provided a method for manufacturing a stator for an automotive alternator including:

an annular winding unit formation process for forming an annular winding unit by winding a continuous wire into an annular shape for a predetermined number of winds, a star-shaped winding unit formation process for forming a star-shaped winding unit from the annular winding unit, the star-shaped winding unit being composed of slot-housed portions disposed at an even angular pitch in a circumferential direction alternately linked by linking portions on a radially-inner side and a radially-outer side; and a winding unit installation process for installing six phases of the star-shaped winding units into a cylindrical stator core formed with slots at a ratio of two per phase per pole, wherein the winding unit installation process is provided with:

a first winding unit installation process for installing a first set of three phases of the star-shaped winding units into the cylindrical stator core so as to be stacked and offset by a predetermined amount in a circumferential direction, and a second winding unit installation process for installing a second set of three phases of the star-shaped winding units into the cylindrical stator core so as to be stacked and offset by the predetermined amount in the circumferential direction.

The slot-housed portions in the sets of three phases of the star-shaped winding units in the first and second winding unit installation processes may be installed in the stator core so as to be stacked and offset by two slots from each other in the circumferential direction.

According to yet another aspect of the present invention, there is provided a method for manufacturing a stator for an automotive alternator including:

an annular winding unit formation process for forming an annular winding unit by winding a continuous wire into an annular shape for a predetermined number of winds;

a star-shaped winding unit formation process for forming a star-shaped winding unit from the annular winding unit, the star-shaped winding unit being composed of slot-housed portions disposed at an even angular pitch in a circumferential direction alternately linked by linking portions on a radially-inner side and a radially-outer side; and a winding unit installation process for installing six phases of the star-shaped winding units into a cylindrical stator core formed with slots at a ratio of two per phase per pole, wherein the winding unit installation process is provided with:

a first winding unit installation process for installing a first set of two phases of the star-shaped winding units into the cylindrical stator core so as to be stacked and offset by a predetermined amount in a circumferential direction, a second winding unit installation process for installing a second set of two phases of the star-shaped winding units into the cylindrical stator core so as to be stacked and offset by the predetermined amount in the circumferential direction, and a third winding unit installation process for installing a third set of two phases of the star-shaped winding units into the cylindrical stator core so as to be stacked and offset by the predetermined amount in the circumferential direction.

The slot-housed portions in the sets of two phases of the star-shaped winding units in the first, second, and third winding unit installation processes may be installed in the stator core so as to be stacked and offset by three slots from each other in the circumferential direction.

DETAILED DESCRIPTION OF THE PREFERRED EMBODIMENTS

The preferred embodiments of the present invention will now be explained with reference to the drawings.

Embodiment 1

Figure 1:
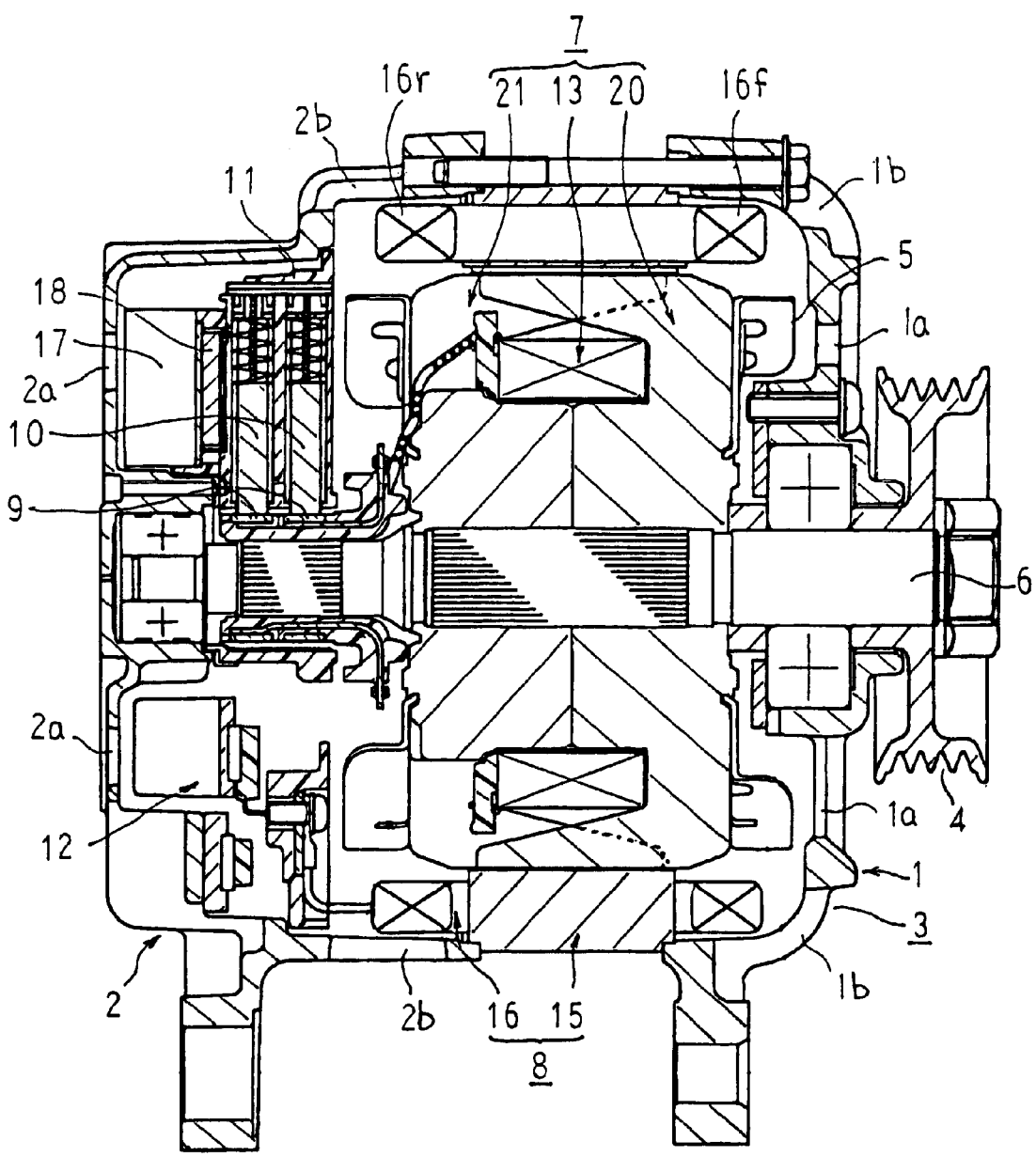
FIG. 1 is a cross section showing an automotive alternator according to Embodiment 1 of the present invention.
Figure 2:
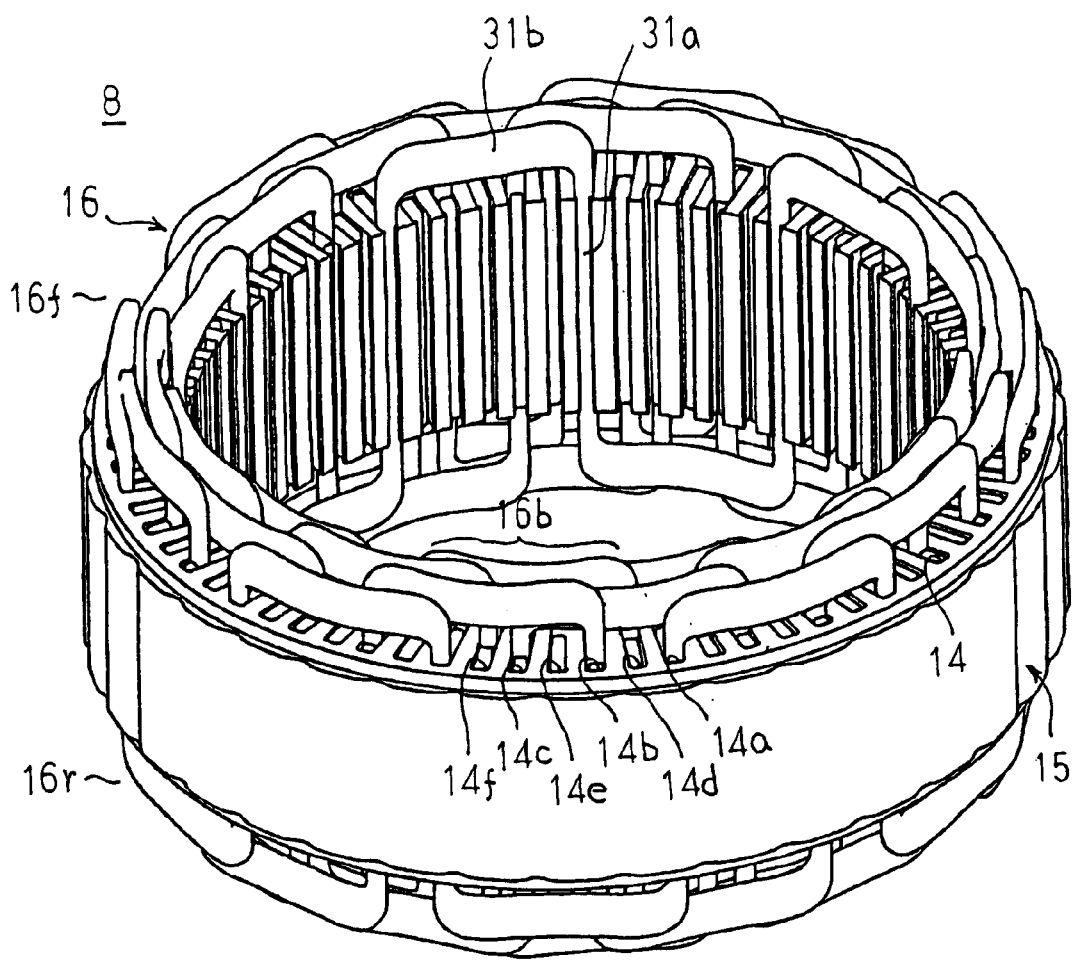
FIG. 2 is a perspective showing a stator of the automotive alternator according to Embodiment 1 of the present invention.
Figure 3:
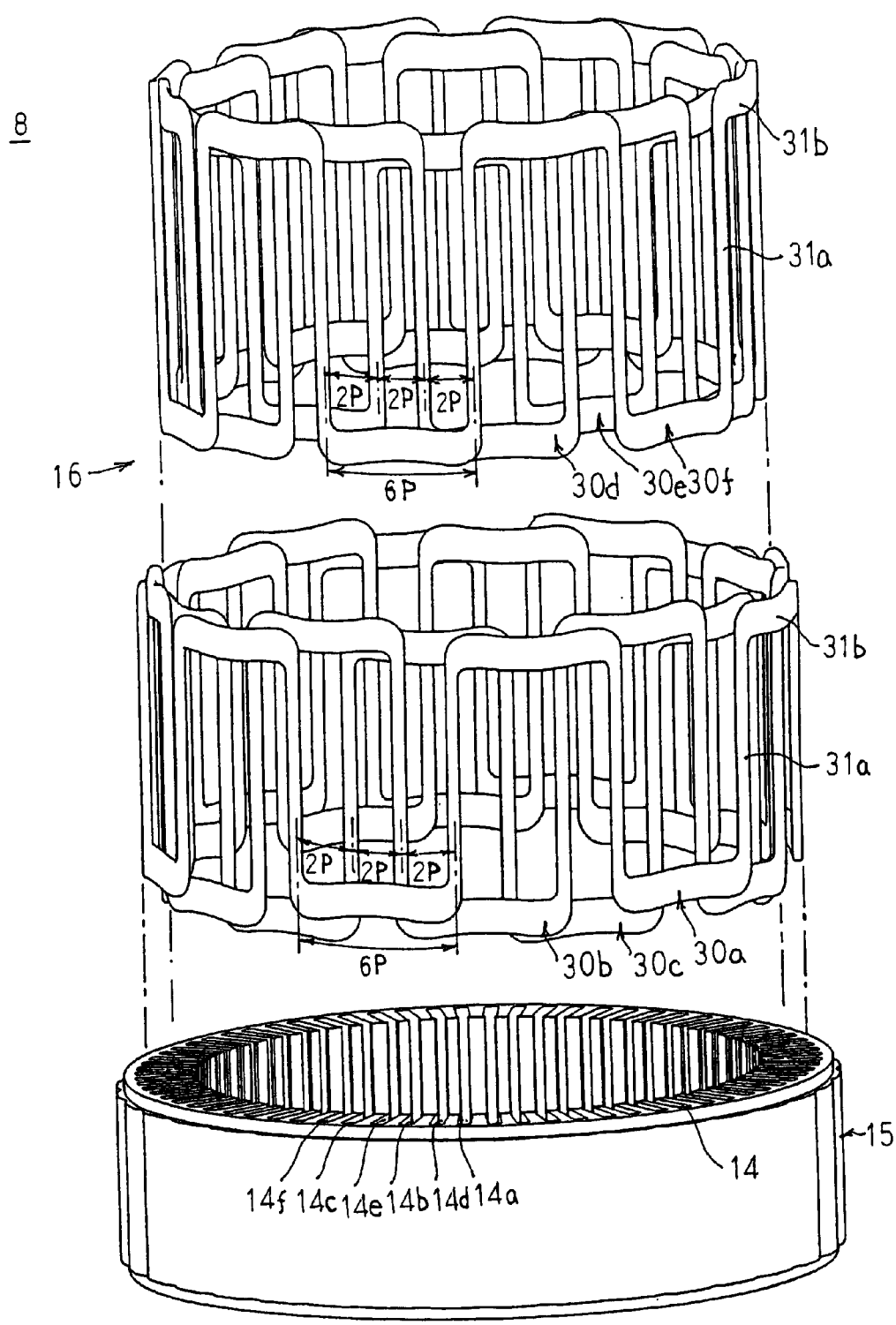
FIG. 3 is an exploded perspective showing the stator of the automotive alternator according to Embodiment 1 of the present invention.
Figure 4:
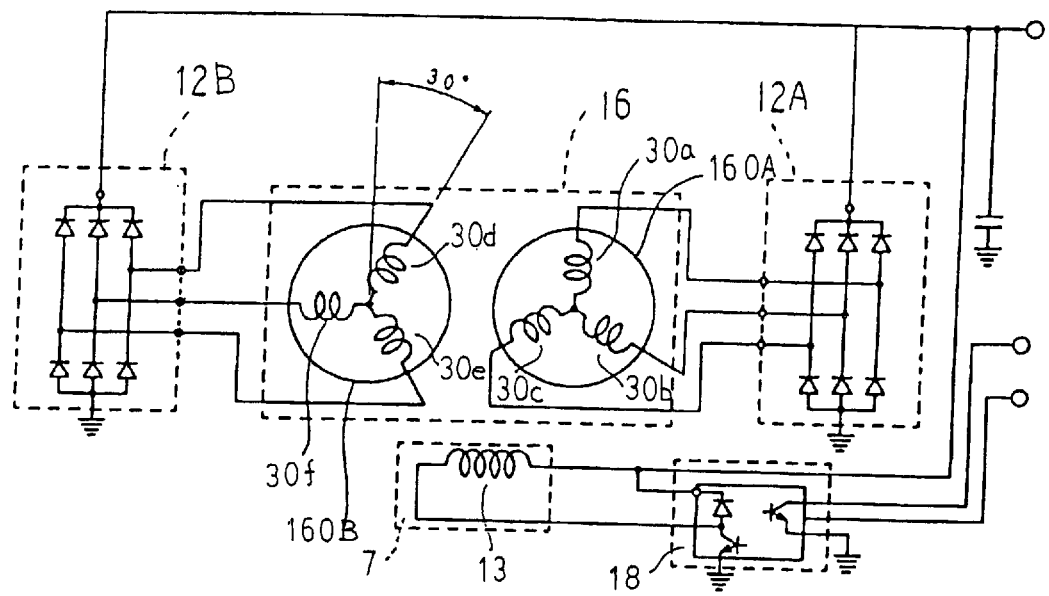
FIG. 4 is a circuit diagram showing an electrical circuit in the automotive alternator according to Embodiment 1 of the present invention.

FIG. 1 is a cross section showing an automotive alternator according to Embodiment 1 of the present invention, FIG. 2 is a perspective showing a stator of the automotive alternator according to Embodiment 1 of the present invention, FIG. 3 is an exploded perspective showing the stator of the automotive alternator according to Embodiment 1 of the present invention, and FIG. 4 is a circuit diagram showing an electrical circuit in the automotive alternator according to Embodiment 1 of the present invention.

In FIG. 1, the automotive alternator includes: a case 3 constituted by an aluminum front bracket 1 and an aluminum rear bracket 2; a shaft 6 disposed inside the case 3 having a pulley 4 secured to a first end thereof; a Lundell-type rotor 7 secured to the shaft 6; cooling fans 5 secured to first and second axial end surfaces of the rotor 7; a stator 8 secured to the case 3 so as to envelop the rotor 7; slip rings 9 secured to a second end of the shaft 6 for supplying an electric current to the rotor 7; a pair of brushes 10 sliding on surfaces of the slip rings 9; a brush holder 11 accommodating the brushes 10; rectifiers 12 electrically connected to the stator 8 for converting an alternating current generated in the stator 8 into a direct current; and a regulator 18 mounted to a heat sink 17 fitted onto the brush holder 11, the regulator 18 adjusting the magnitude of the alternating voltage generated in the stator 8.

The rotor 7 is constituted by a field winding 13 for generating a magnetic flux on passage of an electric current, and a pair of first and second pole cores 20 and 21 disposed so as to cover the field winding 13, magnetic poles being formed in the first and second pole cores 20 and 21 by magnetic flux generated in the field winding 13. The pair of first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15 formed by laminating magnetic steel plates; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

Next, a construction of the stator 8 will be explained with reference to FIGS. 2 to 3.

Slots 14 extending axially are disposed in the stator core 15 at an even angular pitch (a pitch corresponding to an electrical angle of 30°) in a circumferential direction at a ratio of two per phase per pole. In other words, for twelve claw-shaped magnetic poles 22 and 23 in the rotor 7, seventy-two slots 14 are disposed in the stator core 15 so as to obtain the stator winding 16, which is composed of first and second three-phase alternating-current windings 160A and 160B. Here, the slots 14 are arranged in order of an a-phase slot 14a, a d-phase slot 14d, a b-phase slot 14b, an e-phase slot 14e, a c-phase slot 14c, and an f-phase slot 14f repeatedly in a circumferential direction. Moreover, the slots 14 in each phase are disposed at a pitch of six slots.

As shown in FIG. 3, an a-phase winding phase portion 30a is constructed by winding a conductor wire composed of a continuous copper wire coated with electrical insulation for a predetermined number of winds into a wave-shaped pattern composed of twelve slot-housed portions 31a disposed at a pitch of six slots (6P) in a circumferential direction and linking portions 31b linking together end portions of adjacent pairs of the slot-housed portions 31a alternately at first and second axial ends. The a-phase winding phase portion 30a is installed in the stator core 15 such that the slot-housed portions 31a are housed in the respective a-phase slots 14a disposed at the pitch of six slots. The linking portions 31b linking together the end portions of the adjacent pairs of the slot-housed portions 31a extend circumferentially axially outside the stator core 15, constituting coil ends. Furthermore, b-phase, c-phase, d-phase, e-phase, and f-phase winding phase portions 30b, 30c, 30d, 30e, and 30f are constructed in a similar manner.

The a-phase, b-phase, and c-phase winding phase portions 30a, 30b, and 30c are installed in the stator core 15 so as to be circumferentially offset from each other by a pitch of two slots (2P) and stacked in three layers radially. Similarly, the f-phase, d-phase, and e-phase winding phase portions 30f, 30d, and 30e are installed in the stator core 15 so as to be circumferentially offset from each other by a pitch of two slots, to be stacked in three layers radially, and to be positioned on an inner circumferential side of the a-phase, b-phase, and c-phase winding phase portions 30a, 30b, and 30c.

Thus, as shown in FIG. 2, the stator 8 is obtained, in which the six winding phase portions 30a to 30f are installed in the stator core 15 so as to be stacked in six layers radially. Here, the six winding phase portions 30a to 30f are installed in the stator core 15 so as to line up from an outer circumferential side in order of the a-phase winding phase portion 30a, the b-phase winding phase portion 30b, the c-phase winding phase portion 30c, the f-phase winding phase portion 30f, the d-phase winding phase portion 30d, and the e-phase winding phase portion 30e. The coil ends (the linking portions 31b) of the six winding phase portions 30a to 30f constitute front-end and rear-end coil end groups 16f and 16r of the stator winding 16. In addition, crossover portions 16b of the coil ends extending circumferentially relative to the stator core 15 are formed such that heights thereof are low on the inner and outer circumferential sides and high at radially-intermediate portions of the coil end groups 16f and 16r. Moreover, a varnish is impregnated into the coil end groups 16f and 16r.

The a-phase, b-phase, and c-phase winding phase portions 30a, 30b, and 30c constructed in this manner are formed into a Y-connection (an alternating-current connection), constituting a first three-phase alternating-current winding 160A, and the d-phase, e-phase, and f-phase winding phase portions 30d, 30e, and 30f are formed into a Y-connection (an alternating-current connection), constituting a second three-phase alternating-current winding 160B. The first and second three-phase alternating-current windings 160A and 160B are connected to first and second rectifiers 12A and 12B, respectively, constituting the electrical circuit shown in FIG. 4.

Moreover, the a-phase, b-phase, and c-phase winding phase portions 30a, 30b, and 30c are each given a phase difference corresponding to an electrical angle of 60°, and the d-phase, e-phase, and f-phase winding phase portions 30d, 30e, and 30f are each given a phase difference corresponding to an electrical angle of 60°. In addition, the d-phase, e-phase, and f-phase winding phase portions 30d, 30e, and 30f are given a phase difference corresponding to an electrical angle of 30° relative to the a-phase, b-phase, and c-phase winding phase portions 30a, 30b, and 30c, respectively.

In an automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the three-phase alternating-current windings 160A and 160B of the stator winding 16. The alternating electromotive force generated in each of the three-phase alternating-current windings 160A and 160B is converted into direct current by the first and second rectifiers 12A and 12B, respectively, and the magnitudes of the voltages output therefrom are adjusted by the regulator 18. Then, the output from each of the rectifiers 12 is combined, recharging the battery.

Here, front-end and rear-end air intake apertures 1a and 2a are disposed through axial end surfaces of the front bracket 1 and the rear bracket 2, and front-end and rear-end air discharge apertures 1b and 2b are disposed through radial side surfaces of the front bracket 1 and the rear bracket 2 so as to face the coil end groups 16f and 16r of the stator winding 16. Thus, the cooling fans 5 are rotated and driven together with the rotation of the rotor 7, and cooling airflow channels are formed in which external air is sucked inside the case 3 through the front-end and rear-end air intake apertures 1a and 2a, flows axially towards the rotor 7, is then deflected centrifugally by the cooling fans 5, thereafter crosses the coil end groups 16f and 16r, and is discharged outside through the front-end and rear-end air discharge apertures 1b and 2b. As a result, heat generated in the stator 8 is dissipated from the coil end groups 16f and 16r to the cooling airflows, suppressing temperature increases in the stator 8.

In Embodiment 1, a-phase, b-phase, and c-phase winding phase portions 30a, 30b, and 30c constituting the first three-phase alternating-current winding 160A constitute three radially-outer layers of the stator winding 16 installed in the stator core 15, and the d-phase, e-phase, and f-phase winding phase portions 30d, 30e, and 30f constituting the second three-phase alternating-current winding 160B constitute three radially-inner layers. The coil ends of the c-phase winding phase portion 30c of the first three-phase alternating-current winding 160A are adjacent to the coil ends of the f-phase winding phase portion 30f of the second three-phase alternating-current winding 160B. Thus, the probability of the first three-phase alternating-current winding 160A and the second three-phase alternating-current winding 160B short-circuiting is significantly reduced, suppressing the occurrence of complete power failure.

Because the varnish is impregnated into the coil end groups 16f and 16r, gaps between the conductor wires constituting the coil end groups 16f and 16r are filled with the varnish, making it difficult for the cooling airflows supplied by the cooling fans 5 to flow through the inside of the coil end groups 16f and 16r. Thus, wind noise resulting from the cooling airflows flowing through the inside of the coil end groups 16f and 16r is reduced.

Because the crossover portions 16b of the coil ends extending circumferentially relative to the stator core 15 are formed such that the heights thereof are low on the inner and outer circumferential sides and high at the radially-intermediate portions of the coil end groups 16f and 16r, the crossover portions 16b of radially adjacent coil ends are offset axially, suppressing the occurrence of short-circuiting between each of the winding phase portions. Furthermore, because the conductor wire surface area of the coil end groups 16f and 16r exposed to the cooling airflows supplied by the cooling fans 5 is expanded, temperature increases in the stator 8 are suppressed. Because radial expansion of the coil end groups 16f and 16r is reduced, circumferential irregularities in the coil end groups 16f and 16r are limited, reducing wind noise as a result of those irregularities. In addition, because the crossover portions 16b of the coil ends on the outer circumferential sides of the coil end groups 16f and 16r are formed low, insulation distance is ensured between the front-end coil end group 16f and the front bracket 1 and between the rear-end coil end group 16r and the rear bracket 2.

Next, a method for manufacturing the stator 8 will be explained with reference to FIGS. 5 to 10.

Figure 5:
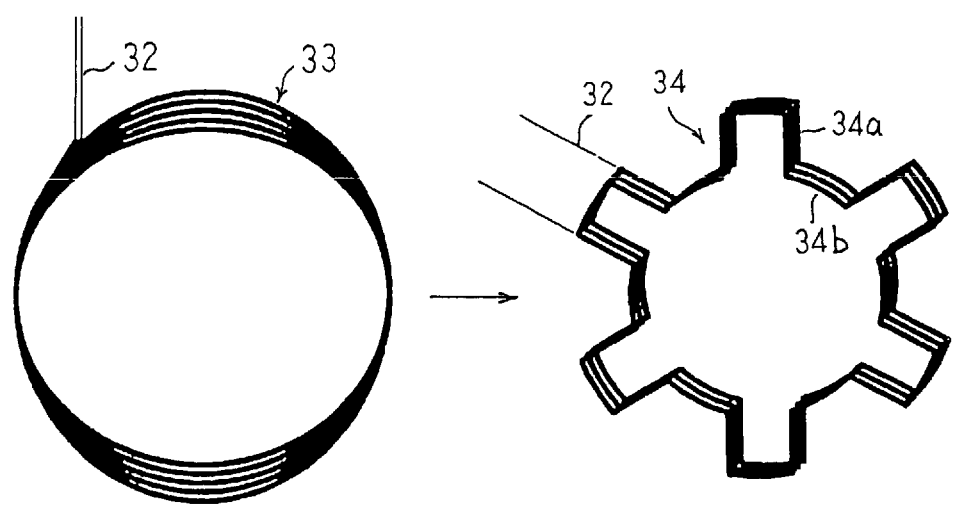
FIG. 5 is a plan showing a star-shaped winding unit formation process in a method for manufacturing the stator of the automotive alternator according to Embodiment 1 of the present invention.

First, as shown in FIG. 5, an annular winding unit 33 is prepared by winding one strand of a conductor wire 32 for a predetermined number of winds, and a star-shaped winding unit 34 is prepared by forming the winding unit 33 into a star shape in which end portions of adjacent pairs of slot-housed portions 34a are alternately linked on an inner circumferential side and an outer circumferential side by linking portions 34b. Then, three star-shaped winding units 34 are stacked on top of each other such that the slot-housed portions 34a of each are offset by two slots circumferentially from the others.

Figure 6:
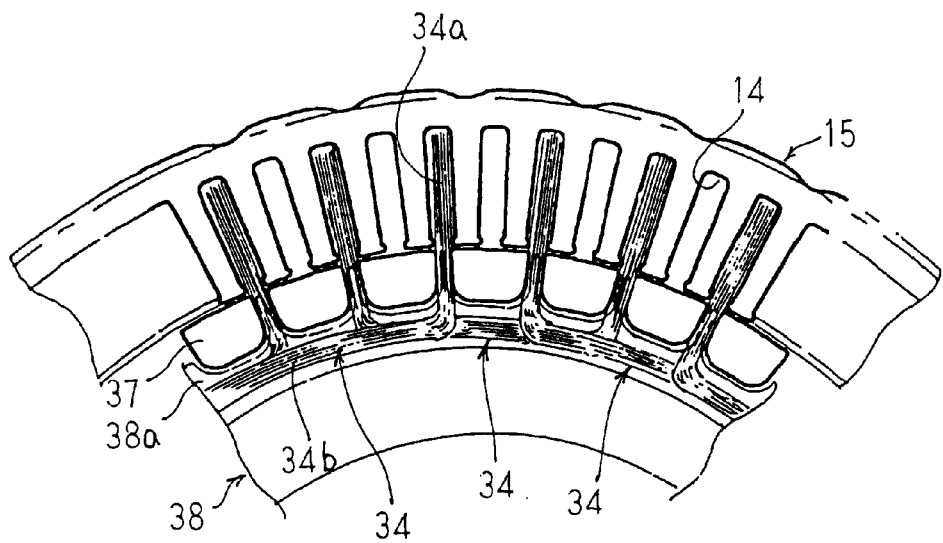
FIG. 6 is an end elevation showing a winding unit installation process in the method for manufacturing the stator of the automotive alternator according to Embodiment 1 of the present invention.
Figure 7:
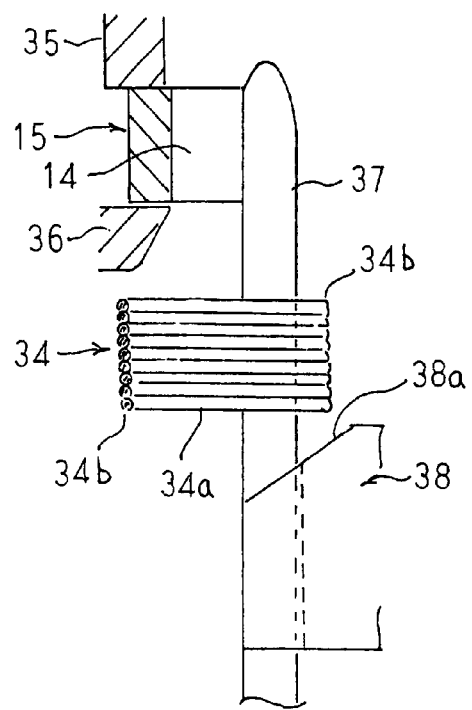
FIG. 7 is a cross section showing the winding unit installation process in the method for manufacturing the stator of the automotive alternator according to Embodiment 1 of the present invention.
Figure 8:
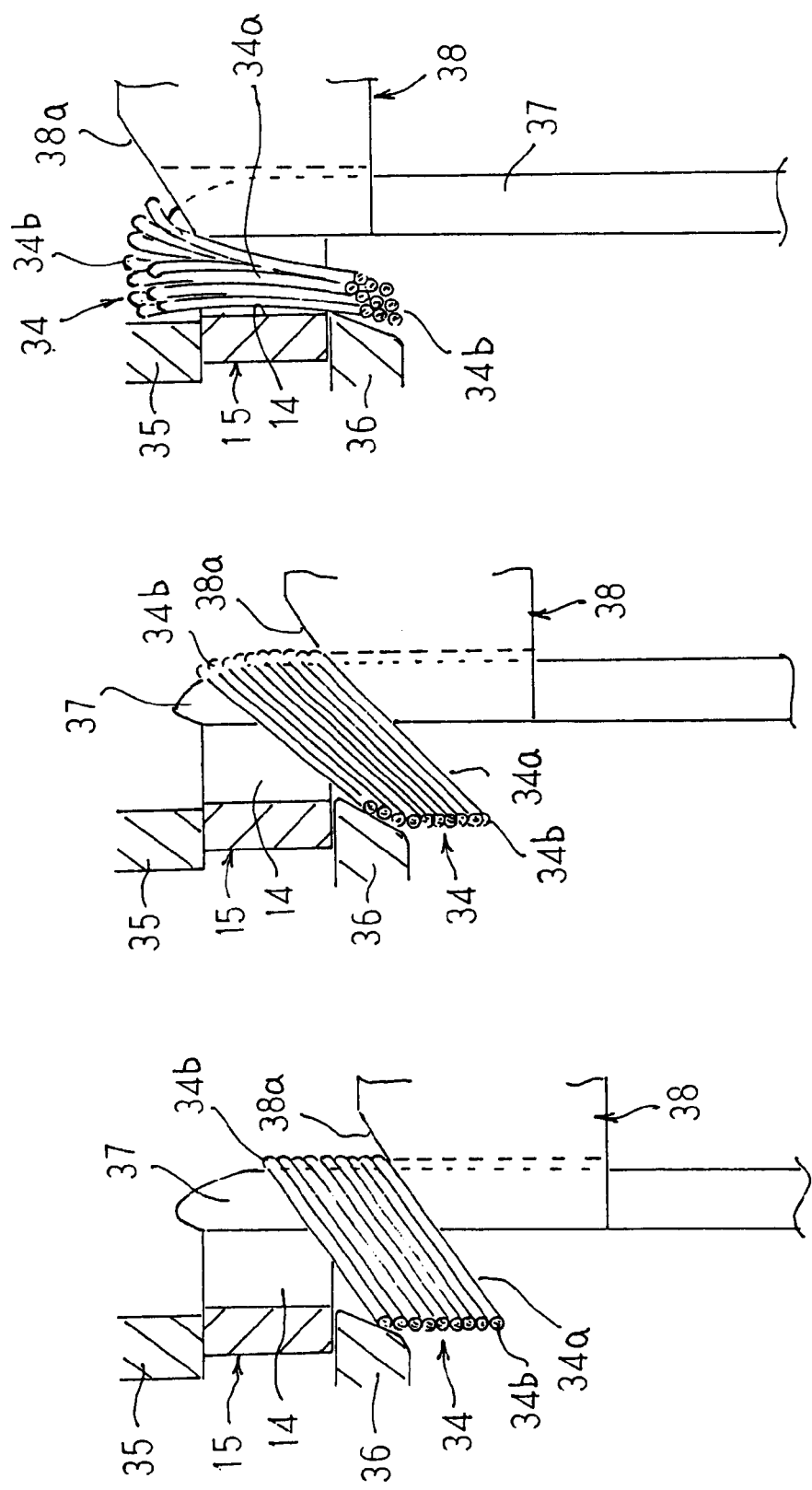
FIG. 8A is a cross section showing the winding unit installation process in the method for manufacturing the stator of the automotive alternator according to Embodiment 1 of the present invention.
FIG. 8B is another cross section showing the winding unit installation process in the method for manufacturing the stator of the automotive alternator according to Embodiment 1 of the present invention.
FIG. 8C is yet another cross section showing the winding unit installation process in the method for manufacturing the stator of the automotive alternator according to Embodiment 1 of the present invention.

Next, as shown in FIGS. 6 and 7, the three star-shaped winding units 34 stacked on top of each other in this manner are set in a winding unit inserter. Here, the stator core 15 is supported by a core holder 35 and a coil holder 36, axially-extending blades 37 being placed on an inner circumferential surface of the stator core 15 so as to open an opening portion of every second slot 14. The three stacked star-shaped winding units 34 are disposed at a lower end of the stator core 15 such that the slot-housed portions 34a thereof are stacked on top of each other in every second slot 14 relative to the axial direction, and the linking portions 34b on the inner circumferential side are positioned on an inclined surface 38a of a stopper 38. The winding unit inserter is constituted by the core holder 35, the coil holder 36, the blades 37, the stopper 38, etc.

Figure 9:
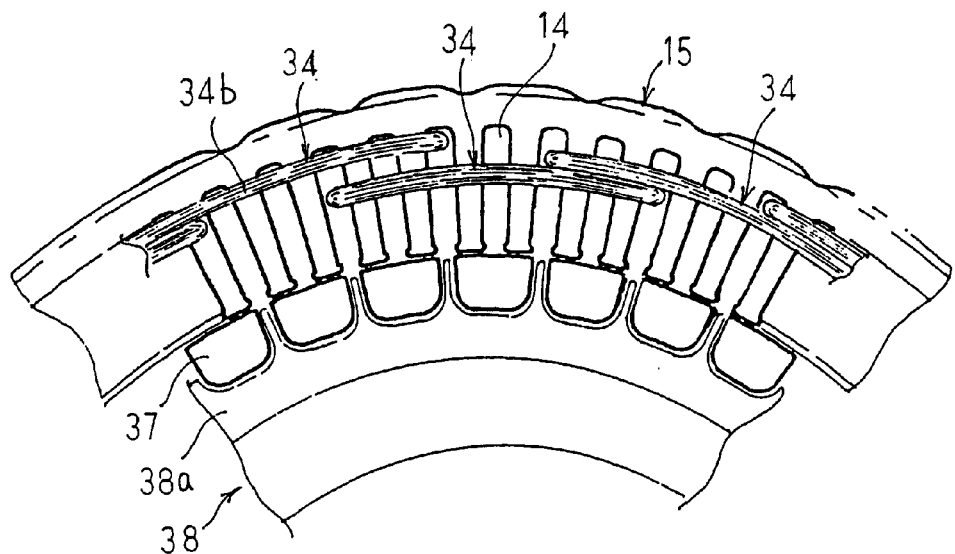
FIG. 9 is an end elevation showing the winding unit installation process in the method for manufacturing the stator of the automotive alternator according to Embodiment 1 of the present invention.

Next, as the stopper 38 is moved upward in FIG. 8A by a driving means (not shown), the linking portions 34b on the inner circumferential side slide over the inclined surface 38a of the stopper 38, are shifted to an outer circumferential side, and eventually come into contact with an inner circumferential surface of the blades 37. As shown in FIGS. 8A and 8B, as the stopper 38 moves further upward, the linking portions 34b on the inner circumferential side move upward along the inner circumferential surface of the blades 37, and the slot-housed portions 34a move upward and gradually incline. Thus, slot-housed portions 34a are guided by the blades 37 and are gradually housed in the slots 14 from the opening portions of the slots 14. At this time, the linking portions 34b on the outer circumferential side are guided by the coil holder 36 and are gradually shifted upward and to the inner circumferential side. As shown in FIG. 8C, as the stopper 38 moves to tip ends of the blades 37, the linking portions 34b on the inner circumferential side are conveyed along the arc-shaped inner circumferential surface of the blades 37 to an upper end of the stator 15, and the slot-housed portions 34a are conveyed completely inside the slots 14. By this first star-shaped winding unit installation process, the three star-shaped winding units 34 are each installed into their respective slots 14 at intervals of six slots as shown in FIG. 9.

Next, the stopper 38 is lowered and the blades 37 are rotated circumferentially by one slot. Thus, the blades 37 are placed on the inner circumferential surface of the stator core 15 so as to open an opening portion of every second slot 14 in which the star-shaped winding units 34 are not yet installed. Then, as above, three stacked star-shaped winding units 34 are disposed at the lower end of the stator core 15 such that the slot-housed portions 34a thereof are stacked on top of each other in every second slot 14 relative to the axial direction, and the linking portions 34b on the inner circumferential side are positioned on the inclined surface 38a of the stopper 38. Then, the stopper 38 is raised and the slot-housed portions 34a are conveyed inside the slots 14 in a similar manner to the first star-shaped winding unit installation process above. By this second star-shaped winding unit installation process, the remaining three star-shaped winding units 34 are each installed into their respective slots 14 at intervals of six slots.

Figure 10:
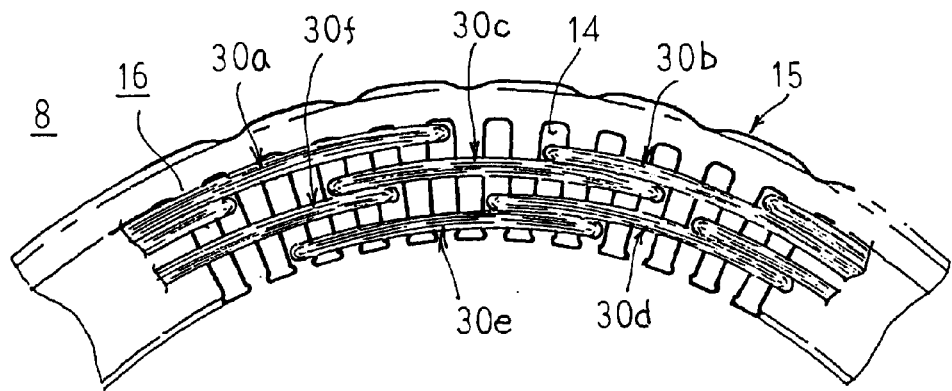
FIG. 10 is an end elevation explaining the installed state of a stator winding in the stator of the automotive alternator according to Embodiment 1 of the present invention.

After installing the six star-shaped winding units 34 in this manner, a coil end shaping process is performed to obtain the stator 8 in which the a-phase, b-phase, and c-phase, d-phase, e-phase, and f-phase winding phase portions 30a, 30b, 30c, 30d, 30e, and 30f are installed so as to line up in six layers radially as shown in FIG. 10.

According to Embodiment 1, because the stator winding 16 is constructed using the star-shaped winding units 34, the production rate of the stator is improved compared to cases in which a stator winding is constructed using short conductor segments, enabling costs to be reduced.

Because three star-shaped winding units 34 are installed in the stator core 15 at a time, two star-shaped winding unit installation processes are sufficient, shortening installation process time for the star-shaped winding units 34 and improving the production rate of the stator.

The first three-phase alternating-current winding 160A is installed by the first star-shaped winding unit installation process, and the second three-phase alternating-current winding 160B is installed by the second star-shaped winding unit installation process. Here, because three star-shaped winding units 34 are stacked on top of each other such that slot-housed portions 34a of each are offset by two slots, the arrangements and shapes of the blades 37 and the stopper 38 are the same in the first and second star-shaped winding unit installation processes. Thus, the winding unit inserter can be shared in the two processes, shortening installation process time for the star-shaped winding units 34.

Because the coil holder 36 is disposed at the lower end of the stator core 15, the linking portions 34b on the outer circumferential side of the star-shaped winding units 34 are guided by the coil holder 36 and move towards the stator core 15. In this manner, the star-shaped winding units 34 are housed in the slots 14 with the slot-housed portions 34a separated from lower end edge portions of bottom portions of the slots 14. Thus, the conductor wires 32 constituting the slot-housed portions 34a are prevented in advance from scraping against the stator core 15 and damaging the electrically-insulating coating, ensuring good insulation.

Because the blades 37 are disposed so as to be on either side of the opening portions of the slots 14, the slot-housed portions 34a are guided by the blades 37 and housed in the slots 14. Thus, the conductor wires 32 constituting the slot-housed portions 34a are prevented in advance from scraping against the stator core 15 and damaging the electrically-insulating coating, ensuring good insulation.

Moreover, in Embodiment 1 above, the six winding phase portions 30a to 30f are installed in the stator core 15 so as to line up from an outer circumferential side in order of the a-phase winding phase portion 30a, the b-phase winding phase portion 30b, the c-phase winding phase portion 30c, the f-phase winding phase portion 30f, the d-phase winding phase portion 30d, and the e-phase winding phase portion 30e. However, the installation order of the six winding phase portions 30a to 30f is not limited to this, provided that the a-phase winding phase portion 30a, the b-phase winding phase portion 30b, and the c-phase winding phase portion 30c constitute the three layers on the outer circumferential side in the radial direction and the d-phase winding phase portion 30d, the e-phase winding phase portion 30e, and the f-phase winding phase portion 30f constitute the three layers on the inner circumferential side in the radial direction.

Furthermore, similar effects can also be achieved if the a-phase winding phase portion 30a, the b-phase winding phase portion 30b, and the c-phase winding phase portion 30c constitute the three layers on the inner circumferential side in the radial direction and the d-phase winding phase portion 30d, the e-phase winding phase portion 30e, and the f-phase winding phase portion 30f constitute the three layers on the outer circumferential side in the radial direction.

Embodiment 2

Figure 11:
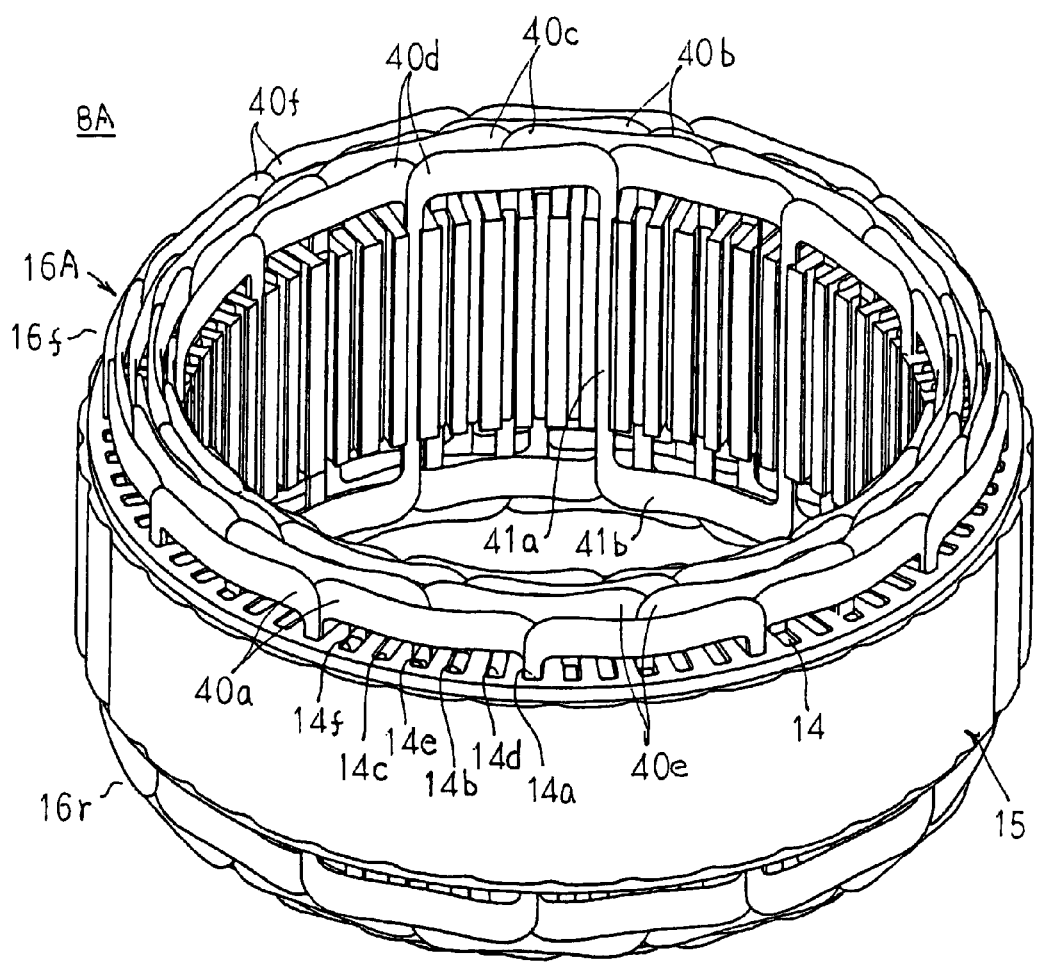
FIG. 11 is a perspective showing a stator of an automotive alternator according to Embodiment 2 of the present invention.
Figure 12:
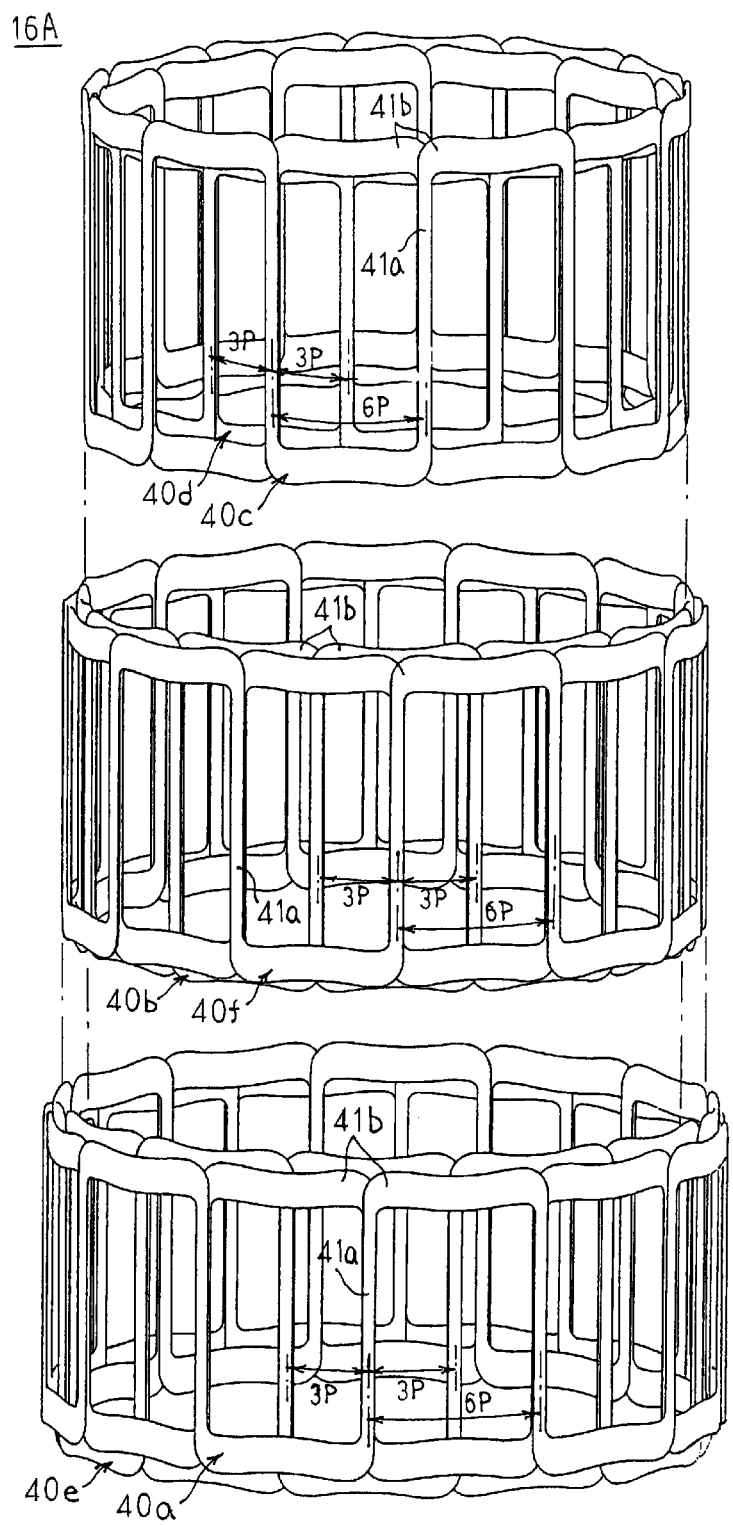
FIG. 12 is an exploded perspective showing a stator winding installed in the stator of the automotive alternator according to Embodiment 2 of the present invention.

FIG. 11 is a perspective showing a stator of an automotive alternator according to Embodiment 2 of the present invention, and FIG. 12 is an exploded perspective showing a stator winding installed in the stator of the automotive alternator according to Embodiment 2 of the present invention.

In FIGS. 11 and 12, a stator 8A is constituted by the stator core 15, and a stator winding 16A installed in the stator core 15.

As shown in FIG. 12, an a-phase winding phase portion 40a is constructed into a divided winding portion in which a conductor wire composed of a continuous copper wire coated with electrical insulation is wound for a predetermined number of winds into a wave-shaped pattern composed of twelve slot-housed portions 41a disposed at a pitch of six slots (6P) in a circumferential direction and linking portions 41b linking together a first half of end portions of adjacent pairs of the slot-housed portions 41a alternately at first and second axial ends and linking together a second half of the end portions alternately at the first and second axial ends. The a-phase winding phase portion 40a is installed in the stator core 15 such that the slot-housed portions 41a are housed in the respective a-phase slots 14a disposed at the pitch of six slots. The linking portions 41b linking together the end portions of the adjacent pairs of the slot-housed portions 41a extend circumferentially axially outside the stator core 15, constituting coil ends. Here, a first half of the linking portions 41b extending outwards from any given a-phase slot 14a extends to a first circumferential side and enters a subsequent a-phase slot 14a on the first circumferential side, and a second half thereof extends to a second circumferential side and enters a subsequent a-phase slot 14a on the second circumferential side.

Furthermore, b-phase, c-phase, d-phase, e-phase, and f-phase winding phase portions 40b, 40c, 40d, 40e, and 40f are constructed in a similar manner.

The a-phase and e-phase winding phase portions 40a and 40e are circumferentially offset from each other by a pitch of three slots (3P) and stacked in two layers radially, and installed in the stator core 15 so as to constitute two layers on an outer circumferential side in a radial direction. Similarly, the d-phase and c-phase winding phase portions 40d and 40c are circumferentially offset from each other by a pitch of three slots and stacked in two layers radially, and installed in the stator core 15 so as to constitute two layers in an intermediate portion in the radial direction. In addition, the b-phase and f-phase winding phase portions 40b and 40f are circumferentially offset from each other by a pitch of three slots and stacked in two layers radially, and installed in the stator core 15 so as to constitute two layers on an inner circumferential side in the radial direction.

Thus, as shown in FIG. 11, the stator 8A is obtained, in which the six winding phase portions 40a to 40f are installed in the stator core 15 so as to be stacked in six layers radially. Here, the six winding phase portions 40a to 40f are installed in the stator core 15 so as to line up from the outer circumferential side in order of the a-phase winding phase portion 40a, the e-phase winding phase portion 40e, the d-phase winding phase portion 40d, the c-phase winding phase portion 40c, the b-phase winding phase portion 40b, and the f-phase winding phase portion 40f. The coil ends (the linking portions 41b) of the six winding phase portions 40a to 40f constitute the front-end and rear-end coil end groups 16f and 16r of the stator winding 16A. In addition, crossover portions of the coil ends extending circumferentially relative to the stator core 15 are formed such that heights thereof are low on the inner and outer circumferential sides and high at the radially-intermediate portions of the coil end groups 16f and 16r. In addition, a varnish is impregnated into the coil end groups 16f and 16r.

The a-phase, b-phase, and c-phase winding phase portions 40a, 40b, and 40c constructed in this manner are formed into a Y-connection (an alternating-current connection), constituting a first three-phase alternating-current winding, and the d-phase, e-phase, and f-phase winding phase portions 40d, 40e, and 40f are formed into a Y-connection (an alternating-current connection), constituting a second three-phase alternating-current winding. The first and second three-phase alternating-current windings are connected to the first and second rectifiers 12A and 12B, respectively, constituting a similar electrical circuit to the electrical circuit shown in FIG. 4.

Moreover, the a-phase, b-phase, and c-phase winding phase portions 40a, 40b, and 40c are each given a phase difference corresponding to an electrical angle of 60°, and the d-phase, e-phase, and f-phase winding phase portions 40d, 40e, and 40f are each given a phase difference corresponding to an electrical angle of 60°. In addition, the d-phase, e-phase, and f-phase winding phase portions 40d, 40e, and 40f are given a phase difference corresponding to an electrical angle of 30° relative to the a-phase, b-phase, and c-phase winding phase portions 40a, 40b, and 40c, respectively.

The stator 8A constructed in this manner is mounted to the automotive alternator in place of the stator 8 and operates in a similar manner to Embodiment 1 above.

In Embodiment 2, the six winding phase portions 40a to 40f are installed in the stator core 15 so as to line up from the outer circumferential side in order of the a-phase winding phase portion 40a, the e-phase winding phase portion 40e, the d-phase winding phase portion 40d, the c-phase winding phase portion 40c, the b-phase winding phase portion 40b, and the f-phase winding phase portion 40f.

Now, because the winding phase portions constituting the first three-phase alternating-current winding and the winding phase portions constituting the second three-phase alternating-current winding are lined up alternately in a radial direction, the coil ends (the linking portions 41b) of the first three-phase alternating-current winding and the coil ends (the linking portions 41b) of the second three-phase alternating-current winding are arranged in a balanced manner in the radial direction. Thus, the coil ends of the first three-phase alternating-current winding and the coil ends of the second three-phase alternating-current winding are uniformly cooled by the cooling airflows supplied by the cooling fans 5, enabling temperature increases in the stator 8A to be suppressed by preventing the temperature of either of the three-phase alternating-current windings from increasing excessively.

The a-phase winding phase portion 40a and the e-phase winding phase portion 40e, which constitute a pair of layers on the outer circumferential side in the radial direction, are arranged such that the linking portions 41b of the e-phase winding phase portion 40e extend outward from the e-phase slots 14e at a circumferentially-central portions of the linking portions 41b of the a-phase winding phase portion 40a. Thus, portions of the coil ends in the vicinity of where the a-phase winding phase portion 40*a* and the e-phase winding phase portion 40*e* are bent circumferentially after extending from the slots 14 (portions where radial expansion is greatest) are maximally separated in the circumferential direction.

Similarly, the d-phase winding phase portion 40*d* and the c-phase winding phase portion 40*c*, which constitute a pair of layers in the intermediate portion in the radial direction, are arranged such that the linking portions 41*b* of the d-phase winding phase portion 40*d* extend outward from the d-phase slots 14*d* at circumferentially-central portions of the linking portions 41*b* of the c-phase winding phase portion 40*c*. Thus, portions of the coil ends in the vicinity of where the d-phase winding phase portion 40*d* and the c-phase winding phase portion 40*c* are bent circumferentially after extending from the slots 14 are maximally separated in the circumferential direction.

In addition, the b-phase winding phase portion 40*b* and the f-phase winding phase portion 40*f*, which constitute a pair of layers on the inner circumferential side in the radial direction, are arranged such that the linking portions 41*b* of the f-phase winding phase portion 40*f* extend outward from the f-phase slots 14*f* at circumferentially-central portions of the linking portions 41*b* of the b-phase winding phase portion 40*b*. Thus, portions of the coil ends in the vicinity of where the b-phase winding phase portion 40*b* and the f-phase winding phase portion 40*f* are bent circumferentially after extending from the slots 14 are maximally separated in the circumferential direction.

As a result, radial expansion of the coil end groups 16*f* and 16*r* is reduced. Thus, because circumferential irregularities in the coil end groups 16*f* and 16*r* are reduced, wind noise resulting from pressure fluctuations between the coil end groups 16*f* and 16*r* and the rotor and between the coil end groups 16*f* and 16*r* and the cooling fans 5 can be reduced.

Because the winding phase portions 40*a* to 40*f* are each constituted by divided winding portions, the linking portions 41*b* (coil ends) of each of the winding phase portions 40*a* to 40*f* extending from the slots 14 are divided in half onto the first and second circumferential sides. Hence, radial overlap between bundles of the conductor wires constituting the winding phase portions 40*a* to 40*f* in the vicinity of where the winding phase portions 40*a* to 40*f* bend circumferentially after extending from the slots 14 is distributed circumferentially, further reducing radial expansion of the coil end groups 16*f* and 16*r*. Thus, because circumferential irregularities in the coil end groups 16*f* and 16*r* are reduced, wind noise resulting from pressure fluctuations between the coil end groups 16*f* and 16*r* and the rotor and between the coil end groups 16*f* and 16*r* and the cooling fans 5 can be reduced.

In Embodiment 2 also, because the varnish is impregnated into the coil end groups 16*f* and 16*r*, the crossover portions of the coil ends extending circumferentially relative to the stator core 15 are formed such that heights thereof are low on the inner and outer circumferential sides and high at the radially-intermediate portions of the coil end groups 16*f* and 16*r*, and the crossover portions of the coil ends on the outer circumferential side of the coil end groups 16*f* and 16*r* are formed low, similar effects to those in Embodiment 1 can be achieved.

Now, in Embodiment 2 above, the winding phase portions constituting the first three-phase alternating-current winding and the winding phase portions constituting the second three-phase alternating-current winding are lined up alternately in a radial direction, but it is sufficient that one of the winding phase portions constituting the first three-phase alternating-current winding constitutes one of the three layers on the inner (or outer) circumferential side in the radial direction, and one of the winding phase portions constituting the first three-phase alternating-current winding constitutes one of the three layers on the outer (or inner) circumferential side in the radial direction. In that case, a balance is established between heat dissipation from the coil ends of the first three-phase alternating-current winding and heat dissipation from the coil ends of the second three-phase alternating-current winding due to the cooling airflows supplied by the cooling fans 5 compared to Embodiment 1 above, in which the winding phase portions constituting the first three-phase alternating-current winding constitute the three layers on the outer circumferential side in the radial direction and the winding phase portions constituting the second three-phase alternating-current winding constitute the three layers on the inner circumferential side in the radial direction, thereby suppressing temperature increases in the stator.

Furthermore, in Embodiment 2 above, the winding phase portions are installed in the stator core 15 such that the a-phase winding phase portion 40*a* and the e-phase winding phase portion 40*e* constitute the pair of layers on the outer circumferential side, the d-phase winding phase portion 40*d* and the c-phase winding phase portion 40*c* constitute the pair of layers in the intermediate portion, and the b-phase winding phase portion 40*b* and the f-phase winding phase portion 40*f* constitute the pair of layers on the inner circumferential side. However, the installation order of the six winding phase portions 40*a* to 40*f* is not limited to this; the six winding phase portions 40*a* to 40*f* may be installed in the stator core 15 such that the a-phase winding phase portion 40*a* and the e-phase winding phase portion 40*e* constitute a first pair of layers on the inner circumferential side, in the intermediate portion, or on the outer circumferential side in the radial direction, the d-phase winding phase portion 40*d* and the c-phase winding phase portion 40*c* constitute a second pair of layers on the inner circumferential side, in the intermediate portion, or on the outer circumferential side in the radial direction, and the b-phase winding phase portion 40*b* and the f-phase winding phase portion 40*f* constitute a third pair of layers on the inner circumferential side, in the intermediate portion, or on the outer circumferential side in the radial direction.

Next, a method for manufacturing the stator 8A will be explained with reference to FIGS. 13A to 17.

Figure 13A:
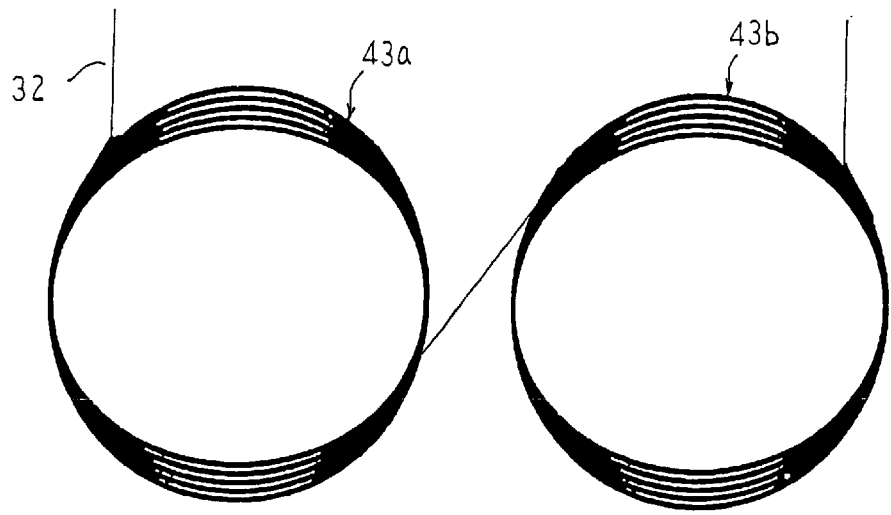
FIG. 13A is a plan showing a star-shaped winding unit formation process in a method for manufacturing the stator of the automotive alternator according to Embodiment 2 of the present invention.
Figure 13B:
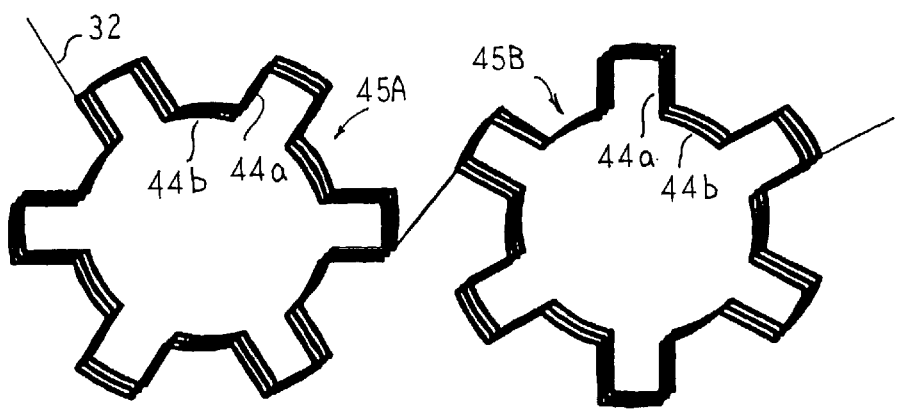
FIG. 13B is another plan showing the star-shaped winding unit formation process in the method for manufacturing the stator of the automotive alternator according to Embodiment 2 of the present invention.
Figure 13C:
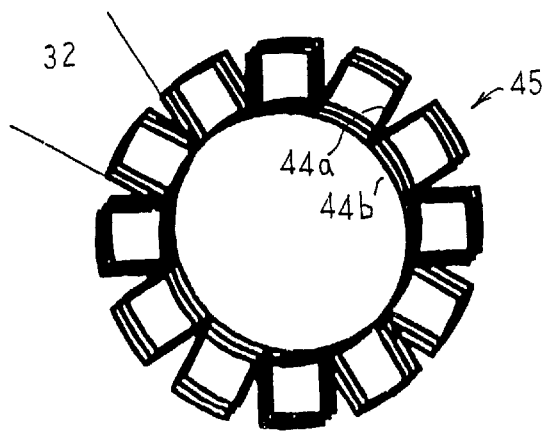
FIG. 13C is yet another plan showing the star-shaped winding unit formation process in the method for manufacturing the stator of the automotive alternator according to Embodiment 2 of the present invention.

First, as shown in FIG. 13A, a first annular winding unit 43*a* is prepared by winding one strand of the conductor wire 32 for a predetermined number of winds, and a second annular winding unit 43*b* is prepared by continuing to wind the strand of the conductor wire 32 for a predetermined number of winds. Next, as shown in FIG. 13B, type-A and type-B star-shaped winding unit portions 45A and 45B composed of one strand of the conductor wire 32 are prepared by forming the first and second annular winding units 43*a* and 43*b* into star shapes in which adjacent pairs of slot-housed portions 44*a* are alternately linked on an inner circumferential side and an outer circumferential side by linking portions 44*b*. Next, as shown in FIG. 13C, the type-A and type-B star-shaped winding unit portions 45A and 45B are folded over at a portion of the conductor wire 32 linking the type-A and type-B star-shaped winding unit portions 45A and 45B and are stacked on top of each other such that the slot-housed portions 44*a* overlap and the linking portions 44*b* face each other radially, to prepare a star-shaped winding unit 45.

Then, two star-shaped winding units 45 are stacked on top of each other such that the slot-housed portions 44*a* of each are offset by three slots circumferentially from each other.

Figure 14:
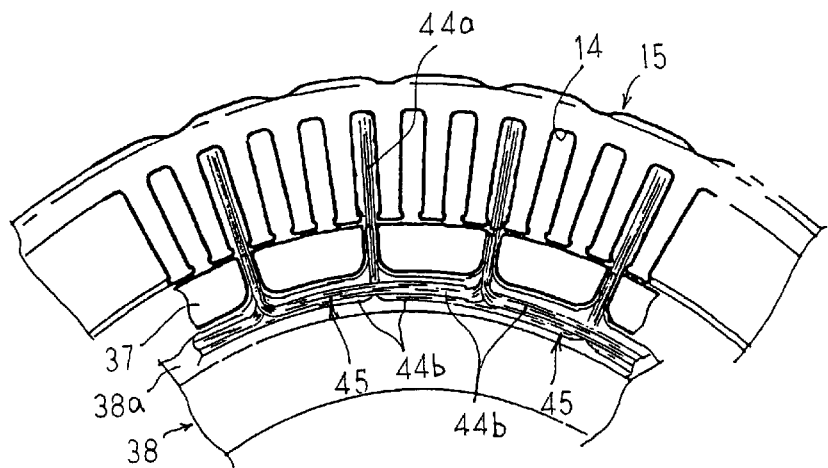
FIG. 14 is an end elevation showing a winding unit installation process in the method for manufacturing the stator of the automotive alternator according to Embodiment 2 of the present invention.

Next, as shown in FIG. 14, the two star-shaped winding units 45 stacked on top of each other in this manner are set in a winding unit inserter. Here, the axially-extending blades 37 are placed on an inner circumferential surface of the stator core 15 so as to open an opening portion of every third slot 14. The two stacked star-shaped winding units 45 are disposed at a lower end of the stator core 15 such that the slot-housed portions 44a thereof are stacked on top of each other in every third slot 14 relative to the axial direction, and the linking portions 44b on the inner circumferential side are positioned on the inclined surface 38a of the stopper 38. Except for the fact that the shapes of the blades 37 and the stopper 38 are different, the winding unit inserter is constructed in a similar manner to the winding unit inserter explained in Embodiment 1.

Figure 15:
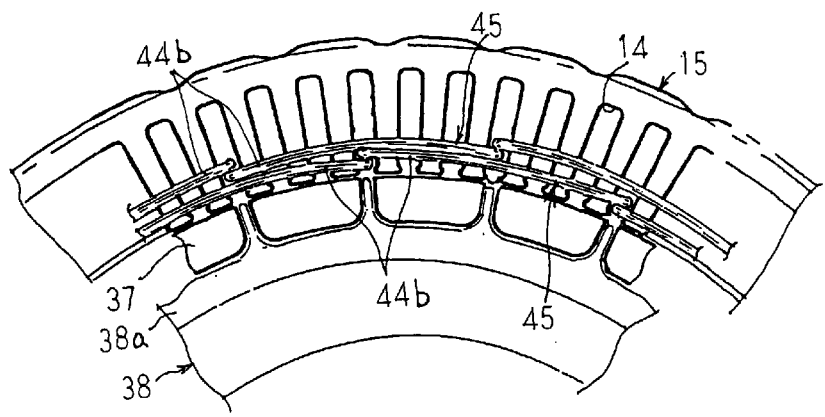
FIG. 15 is another end elevation showing the winding unit installation process in the method for manufacturing the stator of the automotive alternator according to Embodiment 2 of the present invention.

Next, the stopper 38 is moved upward, conveying the slot-housed portions 44a of the two star-shaped winding units 45 inside the slots 14. By this first star-shaped winding unit installation process, a first set of two star-shaped winding units 45 are each installed into their respective slots 14 at intervals of six slots as shown in FIG. 15.

Figure 16:
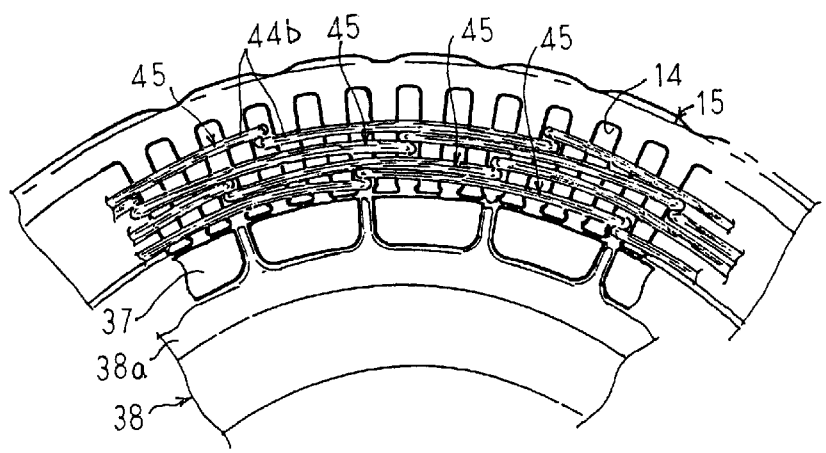
FIG. 16 is yet another end elevation showing the winding unit installation process in the method for manufacturing the stator of the automotive alternator according to Embodiment 2 of the present invention.

Next, the stopper 38 is lowered and the blades 37 are rotated circumferentially by one slot. Thus, the blades 37 are placed on the inner circumferential surface of the stator core 15 so as to open an opening portion of every third slot 14 in which the star-shaped winding units 45 are not yet installed. Then, as above, two stacked star-shaped winding units 45 are disposed at the lower end of the stator core 15 such that the slot-housed portions 44a thereof are stacked on top of each other in every third slot 14 relative to the axial direction, and the linking portions 44b on the inner circumferential side are positioned on the inclined surface 38a of the stopper 38. Then, the stopper 38 is raised, conveying the slot-housed portions 44a of the two star-shaped winding units 45 inside the slots 14 in a similar manner to the first star-shaped winding unit installation process above. By this second star-shaped winding unit installation process, a second set of two star-shaped winding units 45 are each installed into their respective slots 14 at intervals of six slots as shown in FIG. 16.

Figure 17:
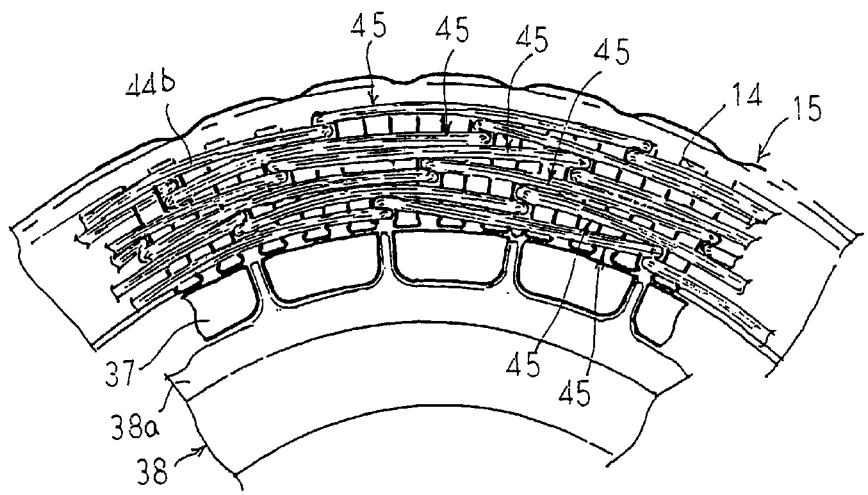
FIG. 17 is still yet another end elevation showing the winding unit installation process in the method for manufacturing the stator of the automotive alternator according to Embodiment 2 of the present invention.
Figure 18:
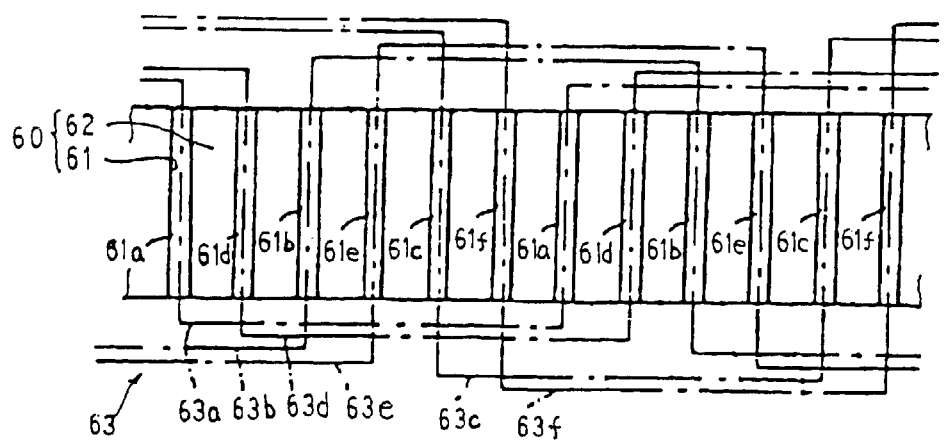
FIG. 18 is a schematic diagram in which a part of the stator in a conventional automotive alternator is developed into a plan.

Then, the stopper 38 is lowered once more and the blades 37 are rotated circumferentially by one slot. Thus, the blades 37 are placed on the inner circumferential surface of the stator core 15 so as to open an opening portion of every third slot 14 in which the star-shaped winding units 45 are not yet installed. Then, as above, two stacked star-shaped winding units 45 are disposed at the lower end of the stator core 15 such that the slot-housed portions 44a thereof are stacked on top of each other in every third slot 14 relative to the axial direction, and the linking portions 44b on the inner circumferential side are positioned on the inclined surface 38a of the stopper 38. Then, the stopper 38 is raised, conveying the slot-housed portions 44a of the two star-shaped winding units 45 inside the slots 14 in a similar manner to the first star-shaped winding unit installation process above. By this third star-shaped winding unit installation process, a third set of two star-shaped winding units 45 are each installed into their respective slots 14 at intervals of six slots as shown in FIG. 17.

After installing the six star-shaped winding units 45 in this manner, a coil end shaping process is performed to obtain the stator 8A in which the a-phase, b-phase, and c-phase, d-phase, e-phase, and f-phase winding phase portions 40a, 40b, 40c, 40d, 40e, and 40f are installed as shown in FIG. 11.

According to Embodiment 2, because two star-shaped winding units 45 are installed in the stator core 15 at a time, three star-shaped winding unit installation processes are sufficient, shortening installation process time for the star-shaped winding units 45 and improving the production rate of the stator.

Because two star-shaped winding units 45 are stacked on top of each other such that the slot-housed portions 44a of each are offset by three slots, the arrangements and shapes of the blades 37 and the stopper 38 are the same in the first, second, and third star-shaped winding unit installation processes. Thus, the winding unit inserter can be shared in each of the star-shaped winding unit installation processes, shortening installation process time for the star-shaped winding units 45.

Moreover, in each of the above embodiments, the number of winds per phase has not been mentioned, but the number of winds is decided and designed in suitable accordance with the characteristics demanded of the alternator.

In each of the above embodiments, the winding phase portions may also be constructed by connecting a plurality of winding sub-portions in parallel. The number of winding sub-portions connected in parallel per phase (the number of parallel circuits) is also decided and designed in suitable accordance with the characteristics demanded of the alternator. When the number of parallel circuits is as many as two or three, the diameter of the conducting wire can be thinner for the same number of winds, facilitating shaping of the conductors. As a result, shaping and insertion of the of the winding into the slots (windability) improves, and because the number of recesses and protrusions in the coil end groups increases, cooling also improves.

In each of the above embodiments, the d-phase, e-phase, and f-phase winding phase portions are given a phase difference corresponding to an electrical angle of 30° relative to the a-phase, b-phase, and c-phase winding phase portions, respectively, but the phase difference between the d-phase, e-phase, and f-phase winding phase portions and the a-phase, b-phase, and c-phase winding phase portions is not limited to (an electrical angle of) 30°; the phase difference between the two may also be (an electrical angle of) 32.5°, for example. In that case, twelfth order electromagnetic vibrational forces, which are a cause of unpleasant higher harmonic noise, are reduced.

In each of the above embodiments, two rectifiers are provided for rectifying each of the first and second three-phase alternating-current windings independently, but the first and second three-phase alternating-current windings may also be rectified by one rectifier after connecting the first and second three-phase alternating-current windings in parallel or in series. In that case, one rectifier is sufficient, making the process of connection to the rectifier easy and inexpensive.

Each of the above embodiments has been explained as applying to an automotive alternator of the type in which the field winding 13 is installed in the pole cores 20 and 21 so as to be covered by the claw-shaped magnetic poles 22 and 23 and rotate with the claw-shaped magnetic poles and the field current is supplied to the field winding through the brushes 10, but similar effects will also be exhibited if the present invention is applied to a brushless automotive alternator in which a field winding is secured to a bracket and a rotating magnetic field is supplied to a stator across air gaps.

The present invention is constructed in the above manner and exhibits the effects described below.

In order to achieve the above object, according to one aspect of the present invention, there is provided an automotive alternator including:

a rotor fixed to a shaft rotatably supported by a case;

a cooling fan disposed on at least one axial end portion of the rotor;

a stator provided with:
  a cylindrical stator core in which slots extending axially are formed at a ratio of two per phase per pole so as to line up circumferentially, the stator core being supported by the case so as to envelop the rotor, and
  a stator winding composed of first and second three-phase alternating-current windings installed in the stator core; and
first and second rectifiers for rectifying an alternating-current output from each of the first and second three-phase alternating-current windings,
wherein the slots are arranged in order of an a-phase slot, a d-phase slot, a b-phase slot, an e-phase slot, a c-phase slot, and an f-phase slot repeatedly in a circumferential direction;
the stator winding is provided with a-phase, b-phase, c-phase, d-phase, e-phase, and f-phase winding phase portions in each of which a conductor wire coated with electrical insulation is installed in a wave shape in a slot group constituted by slots of like phase so as to extend outwards in an axial direction relative to the stator core from any given slot, extend circumferentially, and enter a subsequent slot of like phase;
the first three-phase alternating-current winding is constructed by forming the a-phase winding phase portion, the b-phase winding phase portion, and the c-phase winding phase portion into an alternating current connection;
the second three-phase alternating-current winding is constructed by forming the d-phase winding phase portion, the e-phase winding phase portion, and the f-phase winding phase portion into an alternating current connection;
the a-phase, b-phase, c-phase, d-phase, e-phase, and f-phase winding phase portions are installed in the stator core so as to line up in six layers radially; and
the winding phase portions constituting the first three-phase alternating-current winding constitute three radially-outer layers and the winding phase portions constituting the second three-phase alternating-current winding constitute three radially-inner layers. Thus, an automotive alternator is provided in which the probability of the first and second three-phase alternating-current windings short-circuiting is significantly reduced because coil ends of one of the winding phase portions constituting the first three-phase alternating-current winding are radially adjacent to coil ends of one of the winding phase portions constituting the second three-phase alternating-current winding, suppressing the occurrence of complete power failure.

According to another aspect of the present invention, there is provided an automotive alternator including:
a rotor fixed to a shaft rotatably supported by a case;
a cooling fan disposed on at least one axial end portion of the rotor;
a stator provided with:
  a cylindrical stator core in which slots extending axially are formed at a ratio of two per phase per pole so as to line up circumferentially, the stator core being supported by the case so as to envelop the rotor, and
  a stator winding composed of first and second three-phase alternating-current windings installed in the stator core; and
a rectifier for rectifying an alternating-current output from the stator winding,
wherein the slots are arranged in order of an a-phase slot, a d-phase slot, a b-phase slot, an e-phase slot, a c-phase slot, and an f-phase slot repeatedly in a circumferential direction;
the stator winding is provided with a-phase, b-phase, c-phase, d-phase, e-phase, and f-phase winding phase portions in each of which a conductor wire coated with electrical insulation is installed in a wave shape in a slot group constituted by slots of like phase so as to extend outwards in an axial direction relative to the stator core from any given slot, extend circumferentially, and enter a subsequent slot of like phase;
the first three-phase alternating-current winding is constructed by forming the a-phase winding phase portion, the b-phase winding phase portion, and the c-phase winding phase portion into an alternating current connection;
the second three-phase alternating-current winding is constructed by forming the d-phase winding phase portion, the e-phase winding phase portion, and the f-phase winding phase portion into an alternating current connection;
the a-phase, b-phase, c-phase, d-phase, e-phase, and f-phase winding phase portions are installed the stator core so as to line up in six layers radially; and
a first of the winding phase portions constituting the first three-phase alternating-current winding constitutes one of three radially-inner layers and a second of the winding phase portions constituting the first three-phase alternating-current winding constitutes one of three radially-outer layers. Thus, an automotive alternator is provided in which the first three-phase alternating-current winding and the second three-phase alternating-current winding are cooled in a balanced manner by cooling airflows generated by the cooling fan, suppressing temperature increases in the stator and also suppressing decreases in output.

The winding phase portions constituting the first three-phase alternating-current winding and the winding phase portions constituting the second three-phase alternating-current winding may be lined up alternately in a radial direction, whereby the first three-phase alternating-current winding and the second three-phase alternating-current winding are cooled uniformly by the cooling airflows generated by the cooling fan, reliably suppressing temperature increases in the stator.

The a-phase winding phase portion and the e-phase winding phase portion may constitute a first pair of layers on an inner circumferential side, in an intermediate portion, or on an outer circumferential side in a radial direction, the b-phase winding phase portion and the f-phase winding phase portion may constitute a second pair of layers on the inner circumferential side, in the intermediate portion, or on the outer circumferential side in the radial direction, and the c-phase winding phase portion and the d-phase winding phase portion may constitute a third pair of layers on the inner circumferential side, in the intermediate portion, or on the outer circumferential side in the radial direction, whereby radial expansion of coil end groups is reduced and circumferential irregularities in the coil end groups are reduced, lowering wind noise.

A coil end group of the stator winding may be constituted by coil ends composed of portions of the conductor wires extending outwards from any given slot, extending circumferentially, and entering a subsequent slot of like phase, a varnish being impregnated into the coil end group, whereby a cooling airflow is less likely to flow through the inside of the coil end group, lowering wind noise.

Each of the a-phase, b-phase, c-phase, d-phase, e-phase, and f-phase winding phase portions may be constituted by a divided winding portion, whereby radial expansion of coil end groups is further reduced, reducing wind noise resulting from circumferential irregularities in the coil end groups.

Radially-adjacent crossover portions of the coil ends may be offset axially, suppressing the occurrence of short-circuiting between each of the winding phase portions.

According to yet another aspect of the present invention, there is provided a method for manufacturing a stator for an automotive alternator including:

an annular winding unit formation process for forming an annular winding unit by winding a continuous wire into an annular shape for a predetermined number of winds;

a star-shaped winding unit formation process for forming a star-shaped winding unit from the annular winding unit, the star-shaped winding unit being composed of slot-housed portions disposed at an even angular pitch in a circumferential direction alternately linked by linking portions on a radially-inner side and a radially-outer side; and a winding unit installation process for installing six phases of the star-shaped winding units into a cylindrical stator core formed with slots at a ratio of two per phase per pole, wherein the winding unit installation process is provided with:

a first winding unit installation process for installing a first set of three phases of the star-shaped winding units into the cylindrical stator core so as to be stacked and offset by a predetermined amount in a circumferential direction, and a second winding unit installation process for installing a second set of three phases of the star-shaped winding units into the cylindrical stator core so as to be stacked and offset by the predetermined amount in the circumferential direction. Thus, a method for manufacturing a stator for an automotive alternator is provided enabling the installation time for the stator winding to be shortened and enabling the stator to be manufactured at a high rate of production.

The slot-housed portions in the sets of three phases of the star-shaped winding units in the first and second winding unit installation processes may be installed in the stator core so as to be stacked and offset by two slots from each other in the circumferential direction, enabling a winding unit inserter to be shared in the first and second winding unit installation processes, achieving reductions in cost and increases in productivity.

According to yet another aspect of the present invention, there is provided a method for manufacturing a stator for an automotive alternator including:

an annular winding unit formation process for forming an annular winding unit by winding a continuous wire into an annular shape for a predetermined number of winds;

a star-shaped winding unit formation process for forming a star-shaped winding unit from the annular winding unit, the star-shaped winding unit being composed of slot-housed portions disposed at an even angular pitch in a circumferential direction alternately linked by linking portions on a radially-inner side and a radially-outer side; and a winding unit installation process for installing six phases of the star-shaped winding units into a cylindrical stator core formed with slots at a ratio of two per phase per pole, wherein the winding unit installation process is provided with:

a first winding unit installation process for installing a first set of two phases of the star-shaped winding units into the cylindrical stator core so as to be stacked and offset by a predetermined amount in a circumferential direction, a second winding unit installation process for installing a second set of two phases of the star-shaped winding units into the cylindrical stator core so as to be stacked and offset by the predetermined amount in the circumferential direction, and a third winding unit installation process for installing a third set of two phases of the star-shaped winding units into the cylindrical stator core so as to be stacked and offset by the predetermined amount in the circumferential direction. Thus, a method for manufacturing a stator for an automotive alternator is provided enabling the installation time for the stator winding to be shortened and enabling the stator to be manufactured at a high rate of production.

The slot-housed portions in the sets of two phases of the star-shaped winding units in the first, second, and third winding unit installation processes may be installed in the stator core so as to be stacked and offset by three slots from each other in the circumferential direction, enabling the winding unit inserter to be shared in the first, second, and third winding unit installation processes, achieving reductions in cost and increases in productivity.

What is claimed is:

1. An automotive alternator comprising:

a rotor fixed to a shaft rotatably supported by a case;

a cooling fan disposed on at least one axial end portion of said rotor;

a stator provided with:

a cylindrical stator core in which slots extending axially are formed at a ratio of two per phase per pole so as to line up circumferentially, said stator core being supported by said case so as to envelop said rotor; and a stator winding comprising first and second three-phase alternating-current windings installed in said stator core; and first and second rectifiers for rectifying an alternating-current output from each of said first and second three-phase alternating-current windings, wherein said slots are arranged in order of an a-phase slot, a d-phase slot, a b-phase slot, an e-phase slot, a c-phase slot, and an f-phase slot repeatedly in a circumferential direction;

said stator winding is provided with a-phase, b-phase, c-phase, d-phase, e-phase, and f-phase winding phase portions in each of which a conductor wire coated with electrical insulation is installed in a wave shape in a slot group constituted by slots of the same phase so as to extend outwards in an axial direction relative to said stator core from any given slot, extend circumferentially, and enter a subsequent slot of the same phase;

said first three-phase alternating-current winding is constructed by forming said a-phase winding phase portion, said b-phase winding phase portion, and said c-phase winding phase portion into an alternating current connection;

said second three-phase alternating-current winding is constructed by forming said d-phase winding phase portion, said e-phase winding phase portion, and said f-phase winding phase portion into an alternating current connection;

said a-phase, b-phase, c-phase, d-phase, e-phase, and f-phase winding phase portions are installed in said stator core so as to line up in six layers radially; and said a-phase, b-phase and c-phase winding phase portions constituting said first three-phase alternating-current winding constitute three radially-outer layers and said d-phase, e-phase, and f-phase winding phase portions constituting said second three-phase alternating-current winding constitute three radially-inner layers.

2. The automotive alternator according to claim 1 wherein a coil end group of said stator winding is constituted by coil ends composed of portions of said conductor wires extending outwards from any given slot, extending circumferentially, and entering a subsequent slot of the same phase, a varnish being impregnated into said coil end group.

3. The automotive alternator according to claim 1 wherein each of said a-phase, b-phase, c-phase, d-phase, e-phase, and f-phase winding phase portions is constituted by a divided winding portion.

4. The automotive alternator according to claim 1 wherein radially-adjacent crossover portions of said coil ends are offset axially.

5. An automotive alternator comprising:

a rotor fixed to a shaft rotatably supported by a case;

a cooling fan disposed on at least one axial end portion of said rotor;

a stator provided with:
 a cylindrical stator core in which slots extending axially are formed at a ratio of two per phase per pole so as to line up circumferentially, said stator core being supported by said case so as to envelop said rotor; and
 a stator winding comprising first and second three-phase alternating-current windings installed in said stator core; and a rectifier for rectifying an alternating-current output from said stator winding, wherein said slots are arranged in order of an a-phase slot, a d-phase slot, a b-phase slot, an e-phase slot, a c-phase slot, and an f-phase slot repeatedly in a circumferential direction;

said stator winding is provided with a-phase, b-phase, c-phase, d-phase, e-phase, and f-phase winding phase portions in each of which a conductor wire coated with electrical insulation is installed in a wave shape in a slot group constituted by slots of the same phase so as to extend outwards in an axial direction relative to said stator core from any given slot, extend circumferentially, and enter a subsequent slot of the same phase;

said first three-phase alternating-current winding is constructed by forming said a-phase winding phase portion, said b-phase winding phase portion, and said c-phase winding phase portion into an alternating current connection;

said second three-phase alternating-current winding is constructed by forming said d-phase winding phase portion, said e-phase winding phase portion, and said f-phase winding phase portion into an alternating current connection;

said a-phase, b-phase, c-phase, d-phase, e-phase, and f-phase winding phase portions are installed said stator core so as to line up in six layers radially; and a first one of said a-phase, b-phase and c-phase winding phase portions constituting said first three-phase alternating-current winding constitutes one of three radially-inner layers and a second one of said a-phase, b-phase and c-phase winding phase portions constituting said first three-phase alternating-current winding constitutes one of three radially-outer layers.

6. The automotive alternator according to claim 5 wherein said a-phase, b-phase and c-phase winding phase portions constituting said first three-phase alternating-current winding and said d-phase, e-phase and f-phase winding phase portions constituting said second three-phase alternating-current winding are lined up alternately in a radial direction.

7. The automotive alternator according to claim 6 wherein said a-phase winding phase portion and said e-phase winding phase portion constitute a first pair of layers on an inner circumferential side, in an intermediate portion, or on an outer circumferential side in a radial direction, said b-phase winding phase portion and said f-phase winding phase portion constitute a second pair of layers on said inner circumferential side, in said intermediate portion, or on said outer circumferential side in said radial direction, and said c-phase winding phase portion and said d-phase winding phase portion constitute a third pair of layers on said inner circumferential side, in said intermediate portion, or on said outer circumferential side in said radial direction.

8. The automotive alternator according to claim 5 wherein a coil end group of said stator winding is constituted by coil ends composed of portions of said conductor wires extending outwards from any given slot, extending circumferentially, and entering a subsequent slot of the same phase, a varnish being impregnated into said coil end group.

9. The automotive alternator according to claim 5 wherein each of said a-phase, b-phase, c-phase, d-phase, e-phase, and f-phase winding phase portions is constituted by a divided winding portion.

10. The automotive alternator according to claim 5 wherein radially-adjacent crossover portions of said coil ends are offset axially.

* * * * *